(12) United States Patent
Senda et al.

(10) Patent No.: US 8,901,504 B2
(45) Date of Patent: Dec. 2, 2014

(54) IMAGE PICKUP UNIT AND IMAGE-PICKUP AND DISPLAY SYSTEM

(75) Inventors: Michiru Senda, Kanagawa (JP); Shinji Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 13/571,620

(22) Filed: Aug. 10, 2012

(65) Prior Publication Data

US 2013/0044250 A1 Feb. 21, 2013

(30) Foreign Application Priority Data

Aug. 18, 2011 (JP) .................................. 2011-178682

(51) Int. Cl.
  *G01T 1/24* (2006.01)
  *H04N 5/32* (2006.01)
(52) U.S. Cl.
  CPC ............... *H01N 5/3597* (2013.01); *H04N 5/32* (2013.01)
  USPC .................................................... 250/370.09
(58) Field of Classification Search
  CPC .......................................................... G01T 1/24
  See application file for complete search history.

(56) References Cited

U.S. PATENT DOCUMENTS

| 5,572,257 A | 11/1996 | Conrads et al. |
| 5,668,375 A | 9/1997 | Petrick et al. |
| 2009/0122168 A1 | 5/2009 | Chou |

FOREIGN PATENT DOCUMENTS

| EP | 1 850 582 A1 | 10/2007 |
| JP | 2011-135561 | 7/2011 |

OTHER PUBLICATIONS

Extended European Search Report issued May 14, 2014 for corresponding European Application No. 12179817.7.

*Primary Examiner* — David Porta
*Assistant Examiner* — Hugh H Maupin
(74) *Attorney, Agent, or Firm* — Rader, Fishman & Grauer PLLC

(57) ABSTRACT

An image pickup unit including: an image pickup section including pixels, each of the pixels including a photoelectric conversion device; and a drive section performing a line-sequential readout drive and a line-sequential reset drive. The drive section intermittently performs the line-sequential reset drive multiple times during one frame period, to allow a non-overlap period to be provided at least in part of reset operation periods in an overlap period. The overlap period is a period during which a drive period of one of the multiple line-sequential reset drives and a drive period of one of the remaining multiple line-sequential reset drives are overlapped. The non-overlap period is a period during which each of the reset operations by the one of the multiple line-sequential drives is not overlapped with any of the reset operations by the one of the remaining multiple line-sequential reset drives.

17 Claims, 25 Drawing Sheets

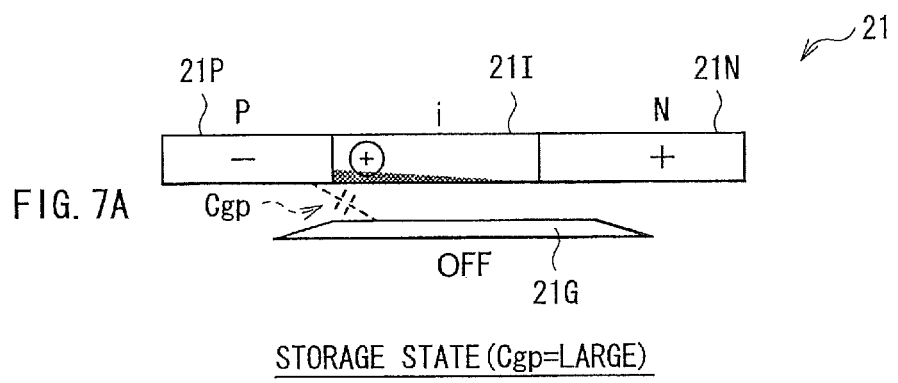
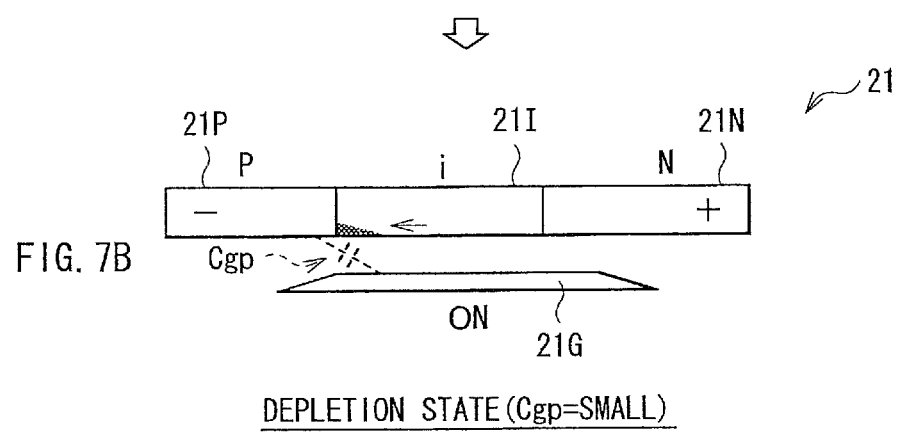
FIG. 7

JUST AFTER END OF Tr1
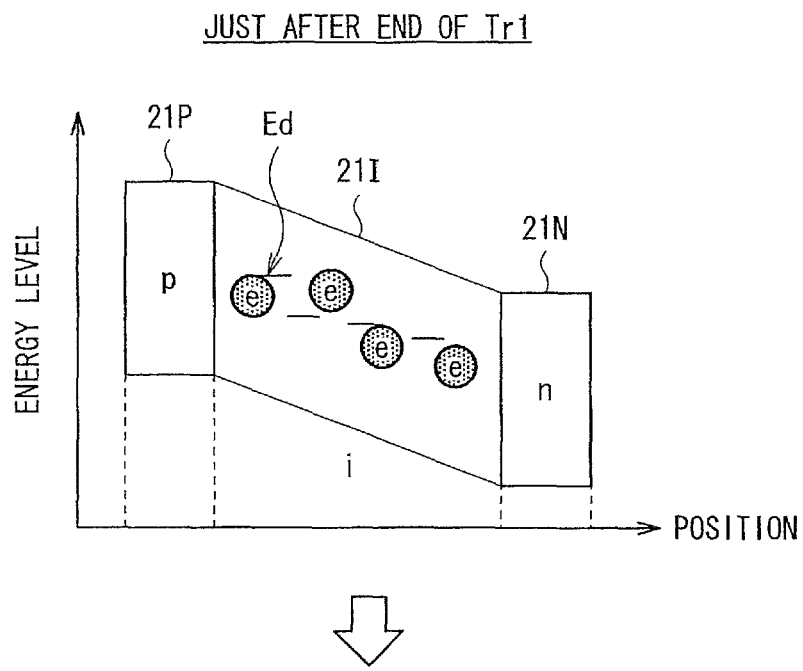
FIG. 10A
AFTER PREDETERMINED TIME ELAPSED FROM Tr1
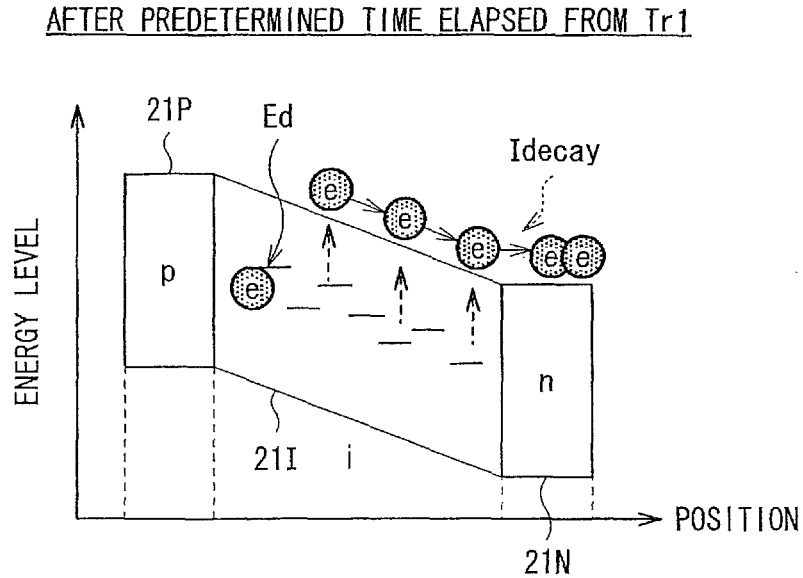
FIG. 10B
FIG. 10

SECOND RESET PERIOD Tr2 (FIRST OPERATION EXAMPLE)

SECOND RESET PERIOD Tr2 (SECOND OPERATION EXAMPLE)

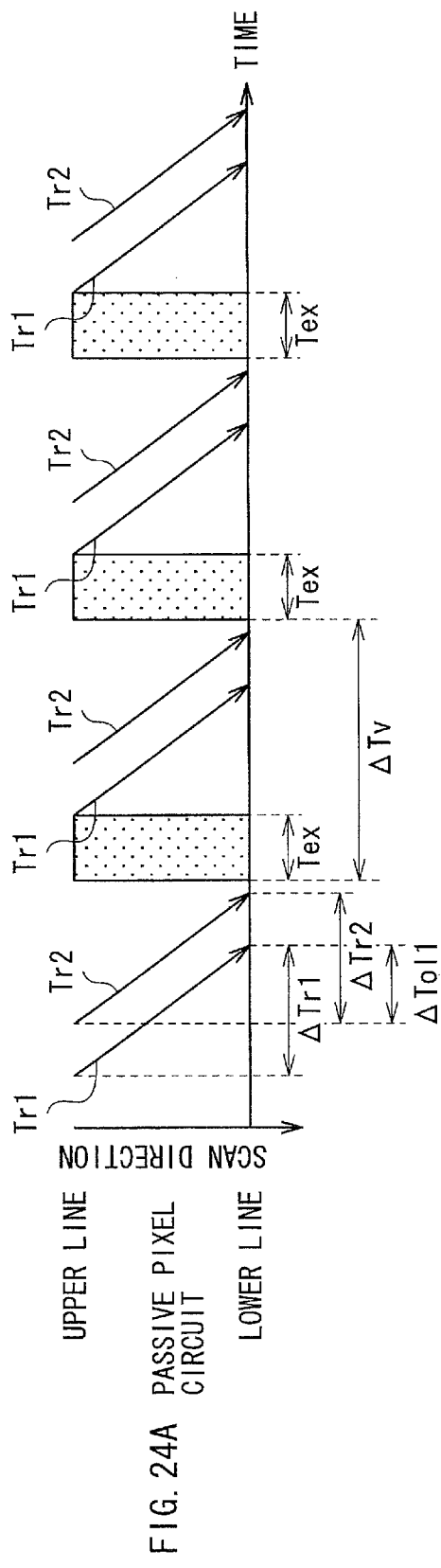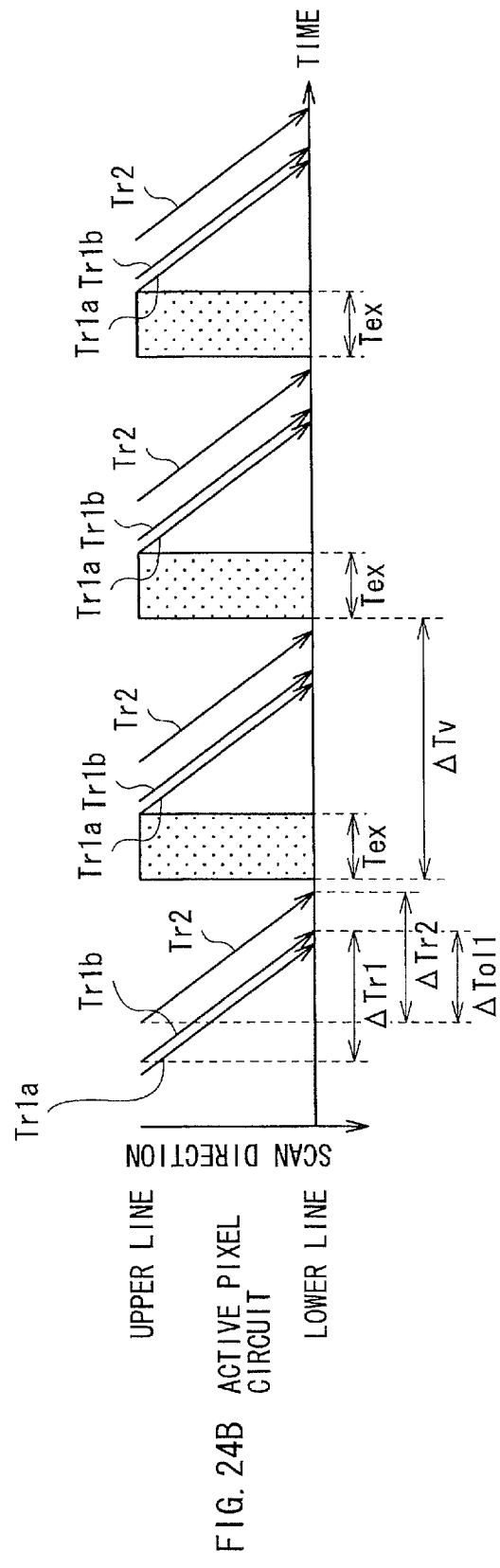

IMAGE PICKUP UNIT AND IMAGE-PICKUP AND DISPLAY SYSTEM

BACKGROUND

This disclosure relates to an image pickup unit including a photoelectric conversion device, and to an image-pickup and display system provided with such an image pickup unit.

Previously, various kinds of image pickup units including a photoelectric conversion device in each pixel (image-pickup pixel) has been proposed. For example, in Japanese Unexamined Patent Application Publication No. 2011-135561, a so-called optical touch panel, a radiation image pickup unit, and the like are described as an example of an image pickup unit having such a photoelectric conversion device.

SUMMARY

Typically, in the above-described image pickup unit, a captured image is obtained by driving a plurality of pixels (performing image-pickup drive). Various kinds of techniques for such image-pickup drive have been proposed. However, an image pickup unit capable of improving degree of freedom of operations (for example, timings) at the time of image-pickup drive is demanded.

It is desirable to provide an image pickup unit capable of improving degree of freedom of operations at the time of image-pickup drive, and an image-pickup and display system provided with such an image pickup unit.

According to an embodiment of the disclosure, there is provided an image pickup unit including: an image pickup section including a plurality of pixels, each of the pixels including a photoelectric conversion device; and a drive section performing a line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset. The drive section intermittently performs the line-sequential reset drive multiple times during one frame period, to allow a non-overlap period to be provided at least in part of the reset operation periods in an overlap period. The overlap period is a period during which a drive period of one of the multiple line-sequential reset drives and a drive period of one of the remaining multiple line-sequential reset drives are overlapped. The non-overlap period is a period during which each of the reset operations by the one of the multiple line-sequential drives is not overlapped with any of the reset operations by the one of the remaining multiple line-sequential reset drives.

According to an embodiment of the disclosure, there is provided an image-pickup and display system including an image pickup unit and a display displaying an image based on an image pickup signal obtained from the image pickup unit. The image pickup unit includes: an image pickup section including a plurality of pixels, each of the pixels including a photoelectric conversion device; and a drive section performing line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset. The drive section intermittently performs the line-sequential reset drive multiple times during one frame period, to allow a non-overlap period to be provided at least in part of the reset operation periods in an overlap period. The overlap period is a period during which a drive period of one of the multiple line-sequential reset drives and a drive period of one of the remaining multiple line-sequential reset drives are overlapped. The non-overlap period is a period during which each of the reset operations by the one of the multiple line-sequential drives is not overlapped with any of the reset operations by the one of the remaining multiple line-sequential reset drives.

In the image pickup unit and the image-pickup and display system according to the embodiments of the disclosure, the line-sequential readout drive for line-sequentially performing the above-described readout operation and the line-sequential reset drive for line-sequentially performing the above-described reset operation are performed. At this time, the line-sequential reset drive is intermittently performed multiple times during one frame period so that a residual charge (remaining amount of the signal charge) in the pixel after the reset operation is reduced. In this case, in the multiple times of the line-sequential reset drives, a non-overlap period during which each of the reset operations by the one of the multiple line-sequential reset drives is not overlapped with any of the reset operations by the one of the remaining multiple line-sequential reset drives is provided at least in a part of the reset operation periods in the overlap period during which the drive period of the one of the multiple line-sequential reset drives is overlapped with the drive period of the one of the remaining multiple line-sequential reset drives. Accordingly, unlike the case where the non-overlap period is not provided at all in the reset operation periods in the overlap period (all of the reset operation periods of the one of the multiple line-sequential reset drives are overlapped with the reset operation periods of the one of the remaining multiple line-sequential reset drives in the overlap period), the timings and the like of the respective reset operations in the multiple times of the line-sequential reset drives are allowed to be arbitrarily set.

According to the image pickup unit and the image-pickup and display system of the embodiments of the disclosure, the non-overlap period is provided at least in a part of the reset operation periods in the overlap period at the time of the multiple times of the line-sequential reset drives. Therefore, the timings and the like of the respective reset operations at the time of the multiple times of the line-sequential reset drives are allowed to be arbitrarily set. As a result, the degree of freedom of the operation at the time of the image-pickup drive is allowed to be improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 7 is a schematic diagram for explaining a storage state and a depletion state of a photoelectric conversion device in a case where the photoelectric conversion device is a lateral PIN photodiode.

FIG. 10 is a characteristic diagram for explaining a generation mechanism of residual charge.

FIGS. 24A and 24B are timing waveform charts illustrating an example of a line-sequential image-pickup drive in a passive pixel circuit and in an active pixel circuit, respectively.

DETAILED DESCRIPTION

Hereinafter, a preferred embodiment of the disclosure will be described in detail with reference to drawings. Note that the description will be given in the following order.

1. Embodiment (Example 1 of a passive pixel circuit)
2. Modification
   Modification 1 (Example 2 of a passive pixel circuit)
   Modifications 2 and 3 (Example of an active pixel circuit)
   Modifications 4 and 5 (Example of an image pickup section taking an image based on radiation)
3. Application example (Application example to an image-pickup and display system)
4. Other modifications Embodiment General Configuration of Image Pickup Unit 1

Figure 1:
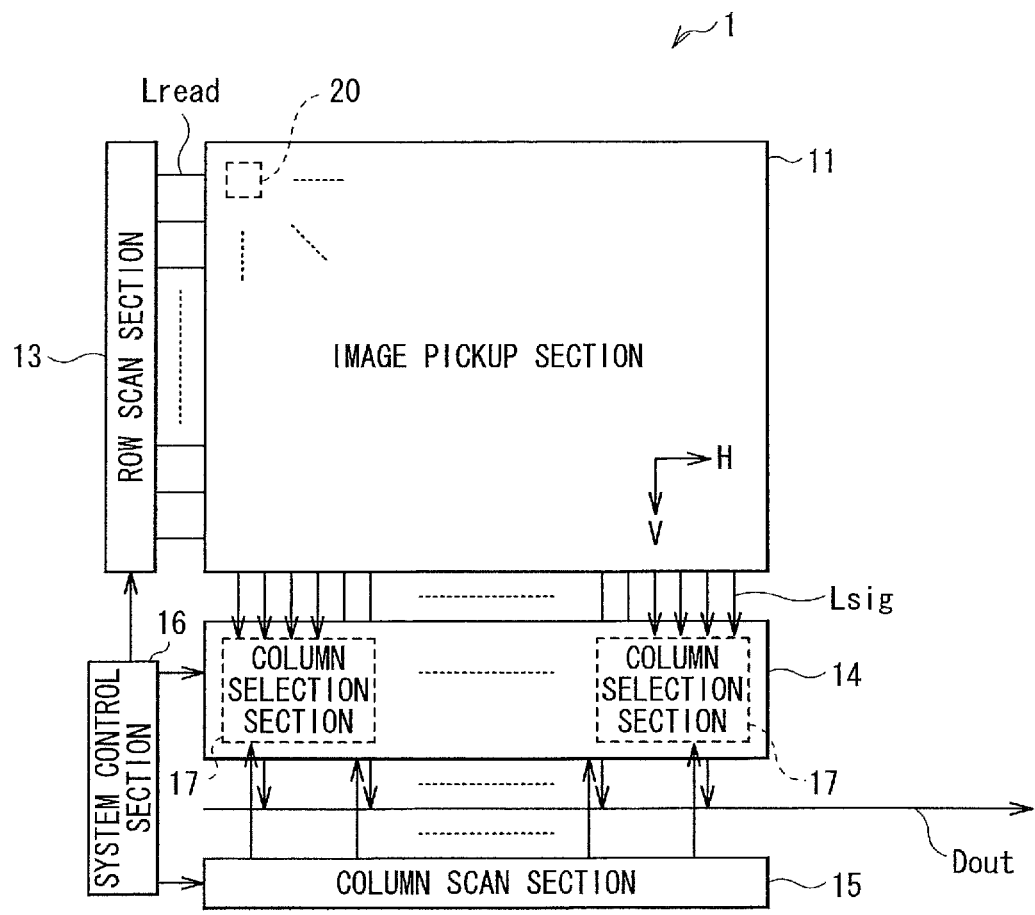
FIG. 1 is a block diagram illustrating a general configuration example of an image pickup unit according to an embodiment of the disclosure.

FIG. 1 illustrates a block configuration of an entire image pickup unit (an image pickup unit 1) according to an embodiment of the disclosure. The image pickup unit 1 reads information of a subject (takes an image of a subject) based on image-pickup light. The image pickup unit 1 includes an image pickup section 11, a row scan section 13, an A/D conversion section 14, a column scan section 15, and a system control section 16. Of these sections, the row scan section 13, the A/D conversion section 14, the column scan section 15, and the system control section 16 correspond to a specific example of "drive section" of the disclosure, and the row scan section 13 corresponds to a specific example of "scan section" of the disclosure.

(Image Pickup Section 11)

The image pickup section 11 generates an electrical signal based on incident image-pickup light (is an image pickup region). In the image pickup section 11, pixels (image-pickup pixels, unit pixels) 20 are two-dimensionally arranged in a matrix. Each of the pixels 20 has a photoelectric conversion section (a photoelectric conversion device 21 described later) which generates photocharge by a charge amount according to light quantity of the incident image-pickup light and stores the photocharge therein. Note that the description is given on the assumption that a horizontal direction (a row direction) in the image pickup section 11 is "H" direction and a vertical direction (a column direction) is "V" direction, as illustrated in FIG. 1.

Figure 2:
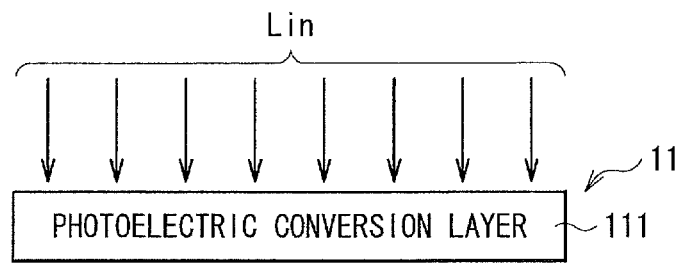
FIG. 2 is a schematic diagram illustrating a schematic configuration example of an image pickup section illustrated in FIG. 1.

FIG. 2 illustrates a schematic configuration example of the image pickup section 11. The image pickup section 11 is provided with a photoelectric conversion layer 111 in which the plurality of pixels 20 described above is arranged. The photoelectric conversion layer 111 performs photoelectric conversion (converts image-pickup light Lin into signal charge) based on incident image-pickup light Lin as illustrated in the figure.

Figure 3:
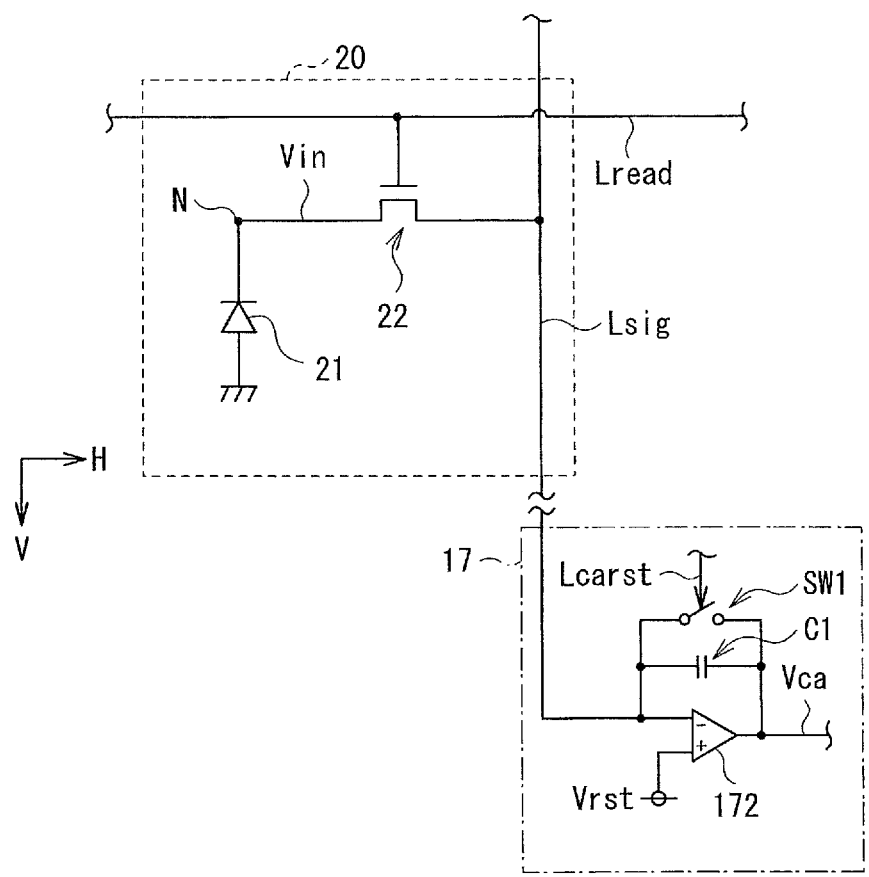
FIG. 3 is a circuit diagram illustrating a detailed configuration example of a pixel and the like illustrated in FIG. 1.

FIG. 3 illustrates a circuit configuration example of the pixel 20 (a circuit configuration example of a so-called passive type) together with a circuit configuration example of a column selection section 17 (described later) in the A/D conversion section 14. The passive pixel 20 includes one photoelectric conversion device 21 and one transistor 22. The pixel 20 is connected to a readout control line Lread extending along the H direction and a signal line Lsig extending along the V direction.

The photoelectric conversion device 21 is formed of a PIN (positive intrinsic negative) photodiode, for example, and generates signal charge by the charge amount corresponding to the light quantity of the incident light (the image-pickup light Lin) as described above. Note that a cathode of the photoelectric conversion device 21 is connected to a storage node N.

The transistor 22 is a transistor (readout transistor) which is turned on in response to a row scan signal supplied through the readout control line Lread, and accordingly outputs signal charge (an input voltage Vin) obtained from the photoelectric conversion device 21 to the signal line Lsig. The transistor 22 is configured of an N-channel (N-type) field effect transistor (FET). However, the transistor 22 may be configured of a P-channel (P-type) FET or the like. The transistor 22 is also configured by using a silicon-based semiconductor such as microcrystalline silicon (Si) and polycrystalline silicon (polysilicon). Alternatively, the transistor 22 may be configured by using an oxide semiconductor such as indium gallium zinc oxide (InGaZnO) and zinc oxide (ZnO). The microcrystalline silicon, the polycrystalline silicon, and the oxide semiconductor have a mobility μ higher than that of amorphous silicon. This enables high speed readout of the signal charge by the transistor 22, for example.

In the pixel 20, a gate of the transistor 22 is connected to the readout control line Lread, a source thereof is connected to the signal line Lsig, and a drain thereof is connected to the cathode (the storage node N) of the photoelectric conversion device 21. In addition, an anode of the photoelectric conversion device 21 is grounded.

(Row Scan Section 13)

The row scan section 13 illustrated in FIG. 1 is a pixel drive section (row scan circuit) which includes a shift resistor circuit, a predetermined logic circuit, and the like, which will be described later, and performs drive (line-sequential scanning) on a row basis (on a horizontal line basis) with respect to the plurality of pixels 20 in the image pickup section 11. Specifically, the row scan section 13 performs such line sequential scanning at the time of line sequential image-pickup drive such as line sequential readout drive and line sequential reset drive, which will be described later. Incidentally, the line sequential scanning is performed by supplying the row scan signal to each of the pixels 20 through the readout control line Lread.

Figure 4:
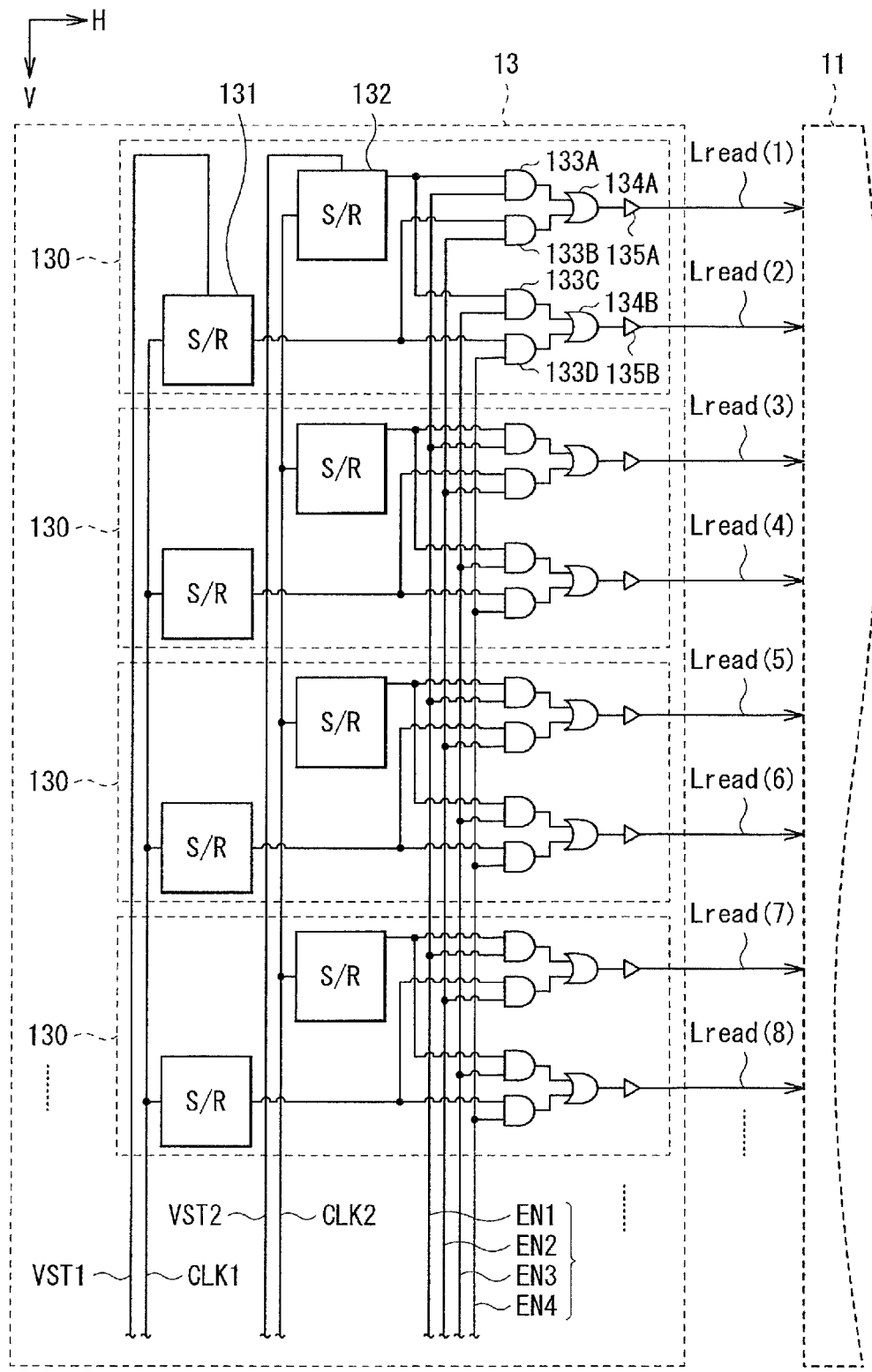
FIG. 4 is a block diagram illustrating a detailed configuration example of a row scan section illustrated in FIG. 1.

FIG. 4 illustrates a block configuration example of the row scan section 13. The row scan section 13 has a plurality of unit circuits 130 arranged along the V direction. Note that herein, eight readout control lines Lread connected to four unit circuits 130 are indicated as Lread(1) to Lread(8) in order from the top of the figure.

Each of the unit circuits 130 includes a plurality of (two, herein) columns of shift resistor circuits 131 and 132 (for convenience, described as "SIR" in a block of the figure; the same hereinafter), four AND circuits (logical product circuits) 133A to 133D, two OR circuits (logical sum circuits) 134A and 134B, and two buffer circuits 135A and 135B. Of these circuits, the AND circuits 133A to 133D and the OR circuits 134A and 134B correspond to a specific example of "logic circuit" of the disclosure.

The shift resistor circuit 131 is a circuit which generates a pulse signal sequentially shifting in the V direction, as an entire of the plurality of unit circuits 130, based on a start pulse VST1 and a clock signal CLK1 supplied from the system control section 16. Likewise, the shift resistor circuit 132 is a circuit which generates a pulse signal sequentially shifting in the V direction, as an entire of the plurality of unit circuits 130, based on a start pulse VST2 and a clock signal CLK2 supplied from the system control section 16. The shift resistor circuits 131 and 132 are provided to correspond to the number of executions (twice, herein) of the line-sequential reset drive performed multiple times, which will be described later (two shift resistor circuits are provided to correspond to the number of the executions of the line-sequential reset drive). Specifically, for example, the shift resistor circuit 131 has a role to generate a pulse signal for a first-time line-sequential reset drive, whereas the shift resistor circuit 132 has a role to generate a pulse signal for a second-time line-sequential reset drive.

The AND circuits 133A to 133D receive four kinds of enable signals EN1 to EN4, respectively. The enable signals EN1 to EN4 are for controlling (defining) a valid period of respective pulse signals (respective output signals) output from the shift resistor circuits 131 and 132. Specifically, a pulse signal from the shift resistor circuit 132 is input to a first input terminal of the AND circuit 133A, and the enable signal EN1 is input to a second input terminal thereof. A pulse signal from the shift resistor circuit 131 is input to a first input terminal of the AND circuit 133B, and the enable signal EN2 is input to a second input terminal thereof. A pulse signal from the shift resistor circuit 132 is input to a first input terminal of the AND circuit 133C, and the enable signal EN3 is input to a second input terminal thereof. A pulse signal from the shift resistor circuit 131 is input to a first input terminal of the AND circuit 133D, and the enable signal EN4 is input to a second input terminal thereof.

The OR circuit 134A is a circuit generating a logical sum signal (an OR signal) of the output signal from the AND circuit 133A and the output signal from the AND circuit 133B. Likewise, the OR circuit 134B is a circuit generating a logical sum signal of the output signal from the AND circuit 133C and the output signal from the AND circuit 133D. In this way, the logical sum signals of the output signals (pulse signals) from the shift resistor circuits 131 and 132 are generated while the valid period of each of the output signals is controlled, by the AND circuits 133A to 133D and the OR circuits 134A and 134B. Accordingly, drive timings and the like at the time of the multiple times of line-sequential reset drives (described later) are defined.

The buffer circuit 135A is a circuit functioning as a buffer with respect to the output signal (the pulse signal) from the OR circuit 134A, and the buffer circuit 135B is a circuit functioning as a buffer with respect to the output signal from the OR circuit 134B. The pulse signals (the row scan signals) buffered by the buffer circuits 135A and 135B are output to respective pixels 20 in the image pickup section 11 through the readout control line Lread.

(A/D Conversion Section 14)

As illustrated in FIG. 1, the A/D conversion section 14 has a plurality of column selection sections 17 each provided for a plurality of (four, herein) signal lines Lsig. The A/D conversion section 14 performs A/D conversion (analog/digital conversion) based on a signal voltage (signal charge) input through the signal line Lsig. Output data Dout (image pickup signal) configured of digital signals is accordingly generated and is output to the outside.

Figure 5:
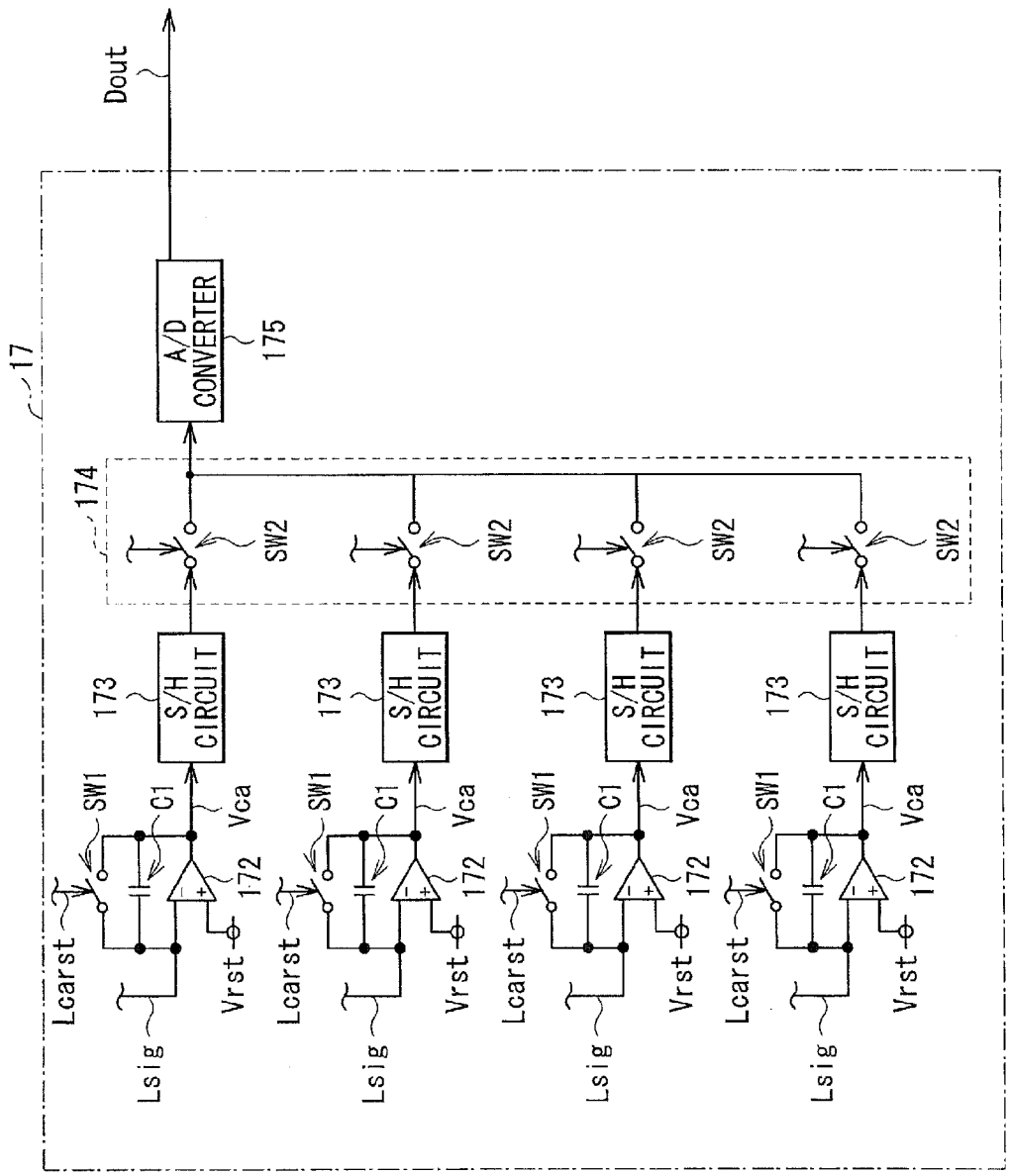
FIG. 5 is a block diagram illustrating a detailed configuration example of a column selection section illustrated in FIG. 1.

As illustrated in FIG. 3 and FIG. 5, for example, each of the column selection sections 17 has a charge amplifier 172, a capacitor (feedback capacitor) C1, a switch SW1, a sample and hold (S/H) circuit 173, a multiplexer circuit (selection circuit) 174 including four switches SW2, and an A/D converter 175. Of these components, the charge amplifier 172, the capacitor C1, the switch SW1, the S/H circuit 173, and the switch SW2 are provided one by one for every signal line Lsig, as illustrated in FIG. 5. On the other hand, the multiplexer circuit 174 and the A/D converter 175 are provided one for the entire column selection section 17.

The charge amplifier 172 is an amplifier for converting a signal charge read out from the signal line Lsig into a voltage (performing Q-V conversion). One end of the signal line Lsig is connected to an input terminal on a negative side (minus side) of the charge amplifier 172, and a predetermined reset voltage Vrst is input to an input terminal on a positive side (plus side) thereof. In addition, a feedback connection is established between the output terminal and the input terminal on the negative side of the charge amplifier 172 through a parallel connection circuit including the capacitor C1 and the switch SW1. In other words, a first terminal of the capacitor C1 is connected to the input terminal on the negative side of the charge amplifier 172, and a second terminal thereof is connected to the output terminal of the charge amplifier 172. Likewise, a first terminal of the switch SW1 is connected to the input terminal on the negative side of the charge amplifier 172, and a second terminal thereof is connected to the output terminal of the charge amplifier 172. Note that the on/off state of the switch SW1 is controlled by a control signal (an amplifier reset control signal) supplied from the system control section 16 through an amplifier reset control line Lcarst. In this way, a charge amplifier circuit performing the above-described Q-V conversion is formed by the charge amplifier 172, the capacitor C1, and the switch SW1.

The S/H circuit 173 is disposed between the charge amplifier 172 and the multiplexer circuit 174 (the switch SW2), and is a circuit for temporarily holding an output voltage Vca from the charge amplifier 172.

The multiplexer circuit 174 is a circuit which selectively connects or disconnects between each of the S/H circuits 173 and the A/D converter 175 by allowing one of the four switches SW2 to be sequentially in on state in response to the scan drive by the column scan section 15.

The A/D converter 175 is a circuit generating and outputting the above-described output data Dout by performing the A/D conversion on the output voltage from the S/H circuit 173, which is input through the switch SW2.

(Column Scan Section 15 and System Control Section 16)

The column scan section 15 includes a shift resistor, an address decoder, and the like (which are not illustrated), and sequentially drives the switches SW2 in the column selection section 17 while performing scanning. By selective scanning by the column scan section 15, the signals (the above-described output data Dout) of the respective pixels 20 read out through the signal lines Lsig are sequentially output to the outside.

The system control section 16 controls operation of each of the row scan section 13, the A/D conversion section 14, and the column scan section 15. Specifically, the system control section 16 has a timing generator generating various kinds of timing signals (control signals) described above, and based on the various kinds of timing signals generated by the timing generator, performs drive control of the row scan section 13, the A/D conversion section 14, and the column scan section 15. In this way, the row scan section 13, the A/D conversion section 14, and the column scan section 15 each perform image-pickup drive (line-sequential image-pickup drive) with respect to the plurality of pixels 20 in the image pickup section 11, based on the control of the system control section 16, so that the output data Dout is provided from the image pickup section 11.

[Function and Effects of Image Pickup Unit 1]

(1. Basic Operation)

As illustrated in FIG. 2, in the image pickup unit 1, when the image-pickup light Lin enters the image pickup section 11 in an exposure period Tex described later, the image-pickup light Lin is converted into a signal charge (photoelectric conversion) in the photoelectric conversion layer 111 (photoelectric conversion device 21 in each of the pixels 20 illustrated in FIG. 3). In the storage node N, voltage variation corresponding to the capacity of the storage node occurs due to the signal charge generated by the photoelectric conversion. Specifically, assuming that the capacity of the storage node is Cs and the generated signal charge is q, the voltage is decreased by the amount of (q/Cs) in the storage node N. According to such a voltage variation, an input voltage Vin (a voltage corresponding to the signal charge) is applied to the drain of the transistor 22. The charge of the input voltage Vin supplied to the transistor 22 is read out from the pixel 20 to the signal line Lsig when the transistor 22 is turned on in response to the row scan signal supplied through the readout control line Lread (readout period).

The signal charge thus read out is input to the column selection section 17 in the A/D conversion section 14, for each of the plurality of (four, herein) pixel rows through the signal lines Lsig. In the column selection section 17, first, the charge amplifier circuit configured of the charge amplifier 172 and the like performs Q-V conversion (converts the signal charge into a signal voltage) for each signal charge input from each of the signal lines Lsig. Subsequently, the A/D converter 175 performs A/D conversion for each of the converted signal voltage (the output voltage Vca from the charge amplifier circuit 172), through the S/H circuit 173 and the multiplexer circuit 174, to generate the output data Dout (image pickup signal) formed of the digital signals. In this way, the output data Dout is output sequentially from each of the column selection sections 17 and is transmitted to the outside.

(2. Operation in Exposure Period Tex and in Readout Period)

Figure 6A:
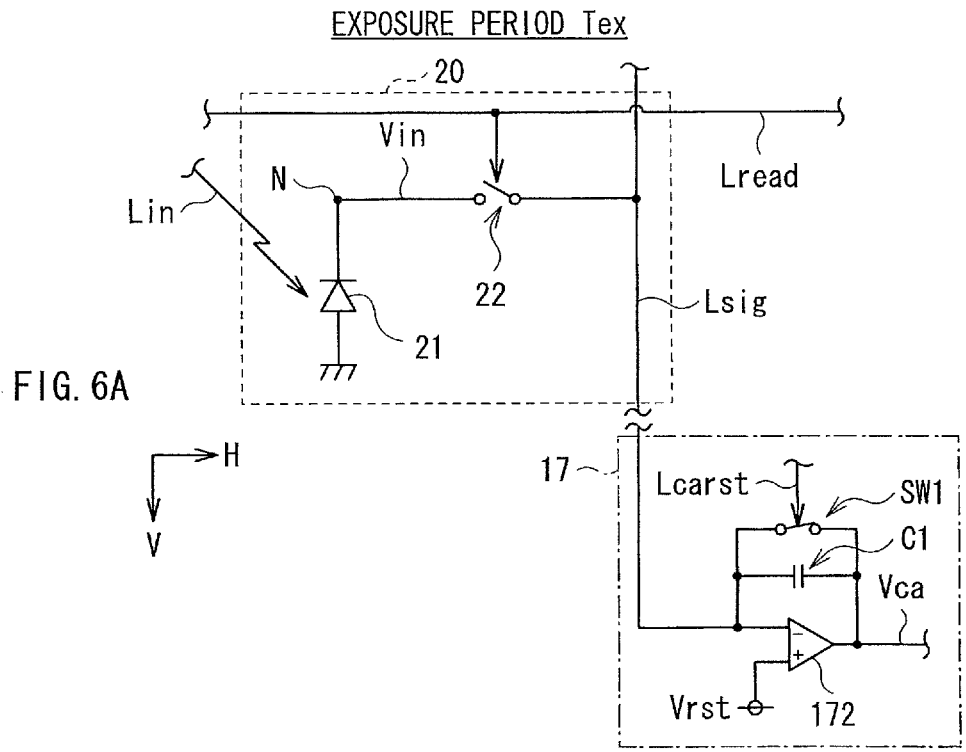
FIGS. 6A and 6B are circuit diagrams illustrating an example of an operation state in an exposure period and a readout/first reset period, respectively.
Figure 6B:
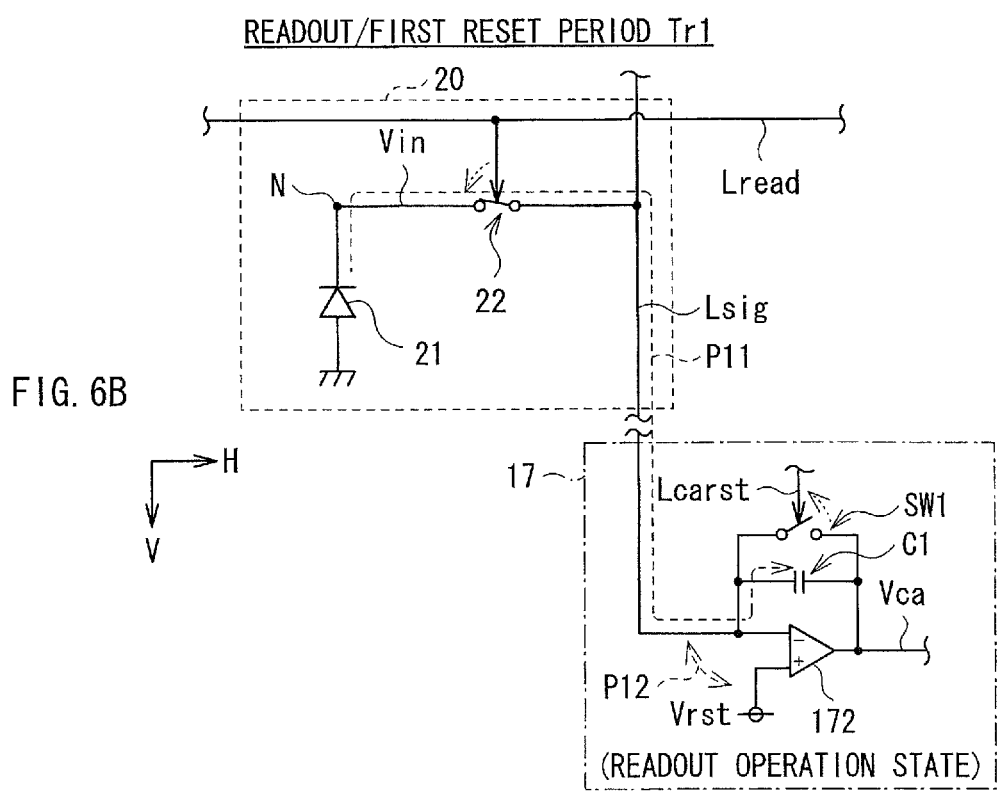

With referring to FIGS. 6A and 6B, the operation of the pixel 20 and the operation of the charge amplifier circuit in the column selection section 17 in the above-described exposure period Tex and in the above-described readout period are described in detail. Note that the on/off state of the transistor 22 is illustrated with use of a switch for convenience of the description.

First, as illustrated in FIG. 6A, in the exposure period Tex in which the image-pickup light Lin enters the photoelectric conversion device 21 in the pixel 20, the transistor 22 is in the off state so that the signal charge stored in the storage node N is not output (read out) to the signal line Lsig during the exposure period Tex. Note that, since the charge amplifier circuit at this time is in a state where the amplifier reset operation (reset operation of the charge amplifier circuit) has been performed, the switch SW1 is in the on state, and as a result, a voltage follower circuit is formed.

On the other hand, the above-described readout period corresponds to a reset operation (a pixel reset operation) period for resetting the signal charge stored in the pixel 20. Specifically, caused by the fact that the pixel 20 of the embodiment is a passive pixel circuit, a "read out operation" for reading out the signal charge obtained by the photoelectric conversion device 21 from the pixel 20 and the "reset operation" described above are performed substantially (concurrently) at the same time. In other words, although the detail will be described later, the line-sequential readout drive for line-sequentially performing the readout operation and the line-sequential reset drive for line-sequentially performing the reset operation are performed (substantially) at the same time by a single line-sequential drive. Incidentally, the reset operation at this time corresponds to the first-time reset operation of the multiple times of (two, herein) reset operations. Accordingly, in the following description, a period during which the readout operation and the first-time reset operation are performed substantially at the same time is referred to as "readout/first reset period Tr1".

In the readout/first reset period Tr1, as illustrated in FIG. 6B, when the transistor 22 is turned on, the signal charge is read out from the storage node N in the pixel 20 to the signal line Lsig (see an arrow P11 in the figure). The signal charge thus read out is input to the charge amplifier circuit. In this case, in the readout/first reset period Tr1, the switch SW1 in the charge amplifier circuit is in the off state. In other words, the charge amplifier circuit is in the readout operation state. Therefore, the signal charge input to the charge amplifier circuit is stored in the capacitor C1, and the signal voltage (output voltage Vca) corresponding to the stored charge is output from the charge amplifier 172. In this way, the signal charge is converted into the signal voltage (Q-V conversion is performed) in the charge amplifier circuit. Incidentally, the charge stored in the capacitor C1 in this way is reset (amplifier reset operation is performed) by turning on the switch SW1 at the time of the amplifier reset operation described later.

Moreover, together with such a readout operation, the first-time reset operation (first reset operation) is performed in the following way in the readout/first reset period Tr1. As illustrated by an arrow P12 in the figure, with use of an imaginary short phenomenon in the charge amplifier circuit (the charge amplifier 172), the first-time reset operation is performed. Specifically, the imaginary short phenomenon allows the voltage of the input terminal on the negative side (signal line Lsig side) of the charge amplifier 172 to be substantially equal to the reset voltage Vrst being applied to the input terminal on the positive side. Therefore, the storage node N in the pixel 20 also becomes the reset voltage Vrst through the transistor 22. In this way, in association with the above-described readout operation, the stored charge of the storage node N is reset to the predetermined reset voltage Vrst.

(3. Remaining of Signal Charge in Pixel 20 after First-Time Reset Operation)

In some cases, a part of the signal charge stored before the first-time reset operation is remained in the pixel 20, even when the above-described first-time reset operation (first reset operation) is performed. If a part of the signal charge is remained in the pixel 20, an after image caused by the residual charge is generated at the time of the subsequent readout operation (at the time of image pickup in the subsequent frame period) and thus the image quality is deteriorated. The remaining of the signal charge (the remaining of the stored charge) in the pixel 20 after the first-time reset operation will be described in detail below with referring to FIG. 7 to FIG. 12.

Figure 8:
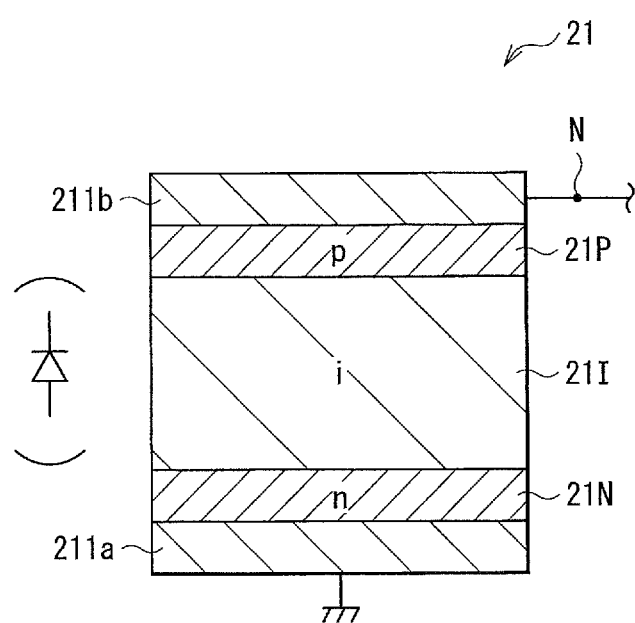
FIG. 8 is a schematic sectional diagram illustrating a configuration example of a photoelectric conversion device which is formed of a vertical PIN photodiode.

In the case where the photoelectric conversion device 21 is a PIN photodiode (thin film photodiode), the structure thereof is largely classified into the two types. Specifically, there are a so-called lateral structure as illustrated in (A) and (B) of FIG. 7 and a so-called vertical structure as illustrated in FIG. 8.

In the case of the lateral structure illustrated in (A) and (B) of FIG. 7, the photoelectric conversion device 21 has a p-type semiconductor layer 21P, an intrinsic semiconductor layer (i-layer) 21I, and an n-type semiconductor layer 21N in this order along the lateral direction (laminate in-plane direction). In addition, the photoelectric conversion device 21 has a gate electrode 21G which is oppositely disposed with a gate insulating film in between (not illustrated) in the vicinity of the intrinsic semiconductor layer 21I. On the other hand, in the case of the vertical structure illustrated in FIG. 8, the photoelectric conversion device 21 has, for example, a lower electrode 211a, the n-type semiconductor layer 21N, the intrinsic semiconductor layer 21I, the p-type semiconductor layer 21P, and an upper electrode 211b in this order along the vertical direction (laminate direction).

(3-1. Generation Mechanism in Case Where Charge in Pixel 20 is Saturated by Irradiation of Strong External Light)

As an example of a generation mechanism of remaining of signal charge described above, the case where the charge in the pixel 20 is saturated due to the irradiation of strong external light is described with an example of the photoelectric conversion device 21 configured of the lateral PIN photodiode. In the photoelectric conversion device 21 with this lateral structure, the intrinsic semiconductor layer 21I is in one state of the storage state (saturation state), the depletion state, and the inversion state, by the gate voltage applied to the gate electrode 21G. Herein, in the case of the thin film photodiode, time of several hundreds μs order is necessary for transition from the state where the charge is induced on the interface on the gate electrode 21G side of the photoelectric conversion device 21 in the storage or inversion state ((A) of FIG. 7), to the depletion state ((B) of FIG. 7). Typically, the PIN photodiode is used in the depletion state because the light sensitivity thereof is the highest in the depletion state. However, when strong external light is irradiated and the state of Vnp<0 V is established, the PIN photodiode is shifted to the storage state. Note that Vnp is a potential of the n-type semiconductor layer 21N viewed from the p-type semiconductor layer 21P side.

Accordingly, for example, even when the environment is changed to a dark state immediately after irradiation of the strong external light and the reset operation (the first-time reset operation) is performed to allow the state to be returned to the state of Vnp>0, the state is not allowed to change from the storage state to the depletion state for several hundreds μs. It is known that the capacity characteristics in the PIN photodiode is different between in the depletion state and in the storage or inversion state, by influence of the charge induced on the interface on the gate electrode 21G side described above. Specifically, as illustrated in (A) and (B) of FIG. 7, the parasitic capacity Cgp formed between the gate electrode 21G and the p-type semiconductor layer 21P is large in the storage state, and is small in the depletion state.

Figure 9:
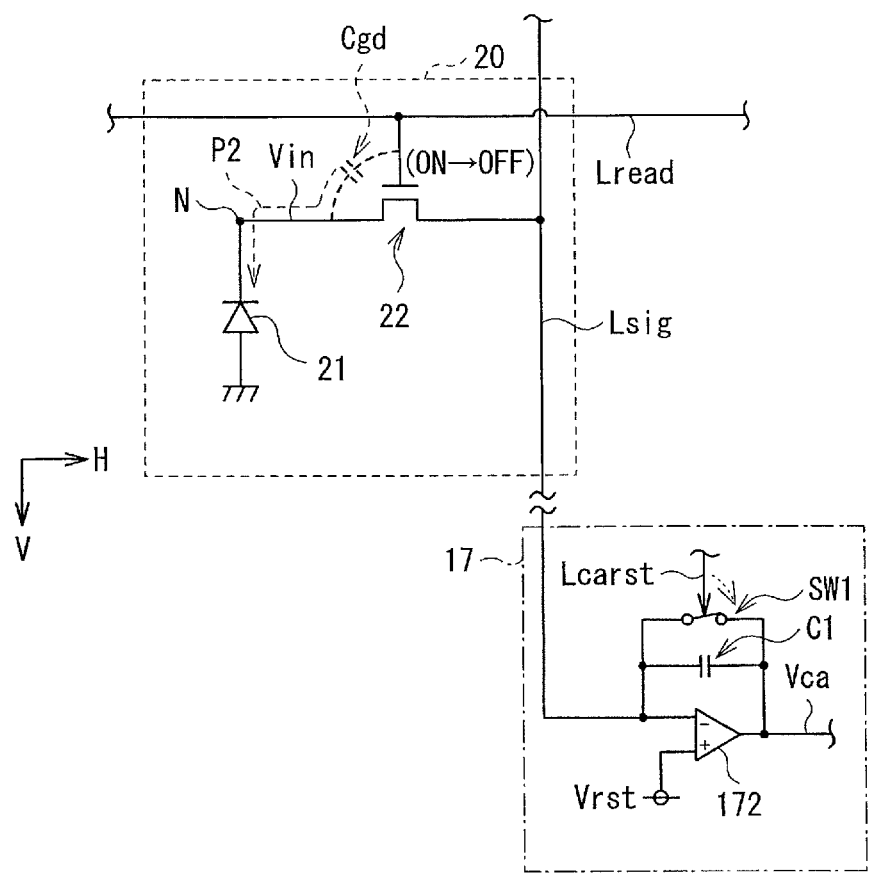
FIG. 9 is a circuit diagram for explaining charge sharing phenomenon caused by a parasitic capacity in a pixel.

On the other hand, the storage node N (storage capacity) in the pixel 20 becomes the predetermined reset voltage Vrst by the first-time reset operation described above. At the time of transition of the transistor 22 from the on state to the off state after the first-time reset operation, the following phenomenon occurs. For example, as illustrated in FIG. 9, caused by the charge stored in the parasitic capacity (the parasitic capacity Cgd formed between the gate and the drain of the transistor 22) in the pixel 20, the potential of the storage node N is slightly varied from the reset voltage Vrst (see the arrow P2 in the figure). Such a phenomenon is referred to as a charge sharing phenomenon (charge injection phenomenon).

As described above, when the parasitic capacity Cgp in the PIN photodiode (the photoelectric conversion device 21) connected to the storage node N is different between in the depletion state and in the storage or inversion state, the entire coupling amount (the size of the parasitic capacity) in the pixel 20 is varied by the state of the photoelectric conversion device 21. This influence allows the information (charge) of the light (the image-pickup light Lin) incident until just before to remain in the storage node N, even after the first-time reset operation. From this mechanism, in the case where the charge in the pixel 20 is saturated by the irradiation of the strong external light, even when the first-time reset operation is performed, a part of the signal charge stored before the first-time reset operation is remained in the pixel 20. Herein, the case of the lateral structure illustrated in (A) and (B) of FIG. 7 is described as an example. However, also in the case of the vertical structure illustrated in FIG. 8, for example, when the charge in the pixel 20 is saturated by the irradiation of the strong external light, the remaining of the signal charge occurs by the similar mechanism.

(3-2. Typical Generation Mechanism)

Subsequently, typical generation mechanism of the remaining of the signal charge (residual charge) not limited to the above-described case (the case where the charge in the pixel 20 is saturated by the irradiation of strong external light) will be described. In other words, the description is given on the case where, even if strong external light causing the capacity variation is not irradiated, the residual charge is generated by the Decay current generated from the photoelectric conversion device 21 (PIN photodiode), which will be described below.

(A) and (B) of FIG. 10 each illustrate an energy band structure (relationship between the position of each layer and an energy level) in the above-described PIN photodiode. It is apparent from the figures that various defect levels Ed are present in the intrinsic semiconductor layer 21I. As illustrated in (A) of FIG. 10, the charge e is trapped in each of the defect levels Ed immediately after the readout/first reset period Tr1 (the first-time reset operation) is ended. However, as illustrated in (B) of FIG. 10, for example, the charge e trapped in the defect level Ed is released to the outside of the photodiode (photoelectric conversion device 21) from the intrinsic semiconductor layer 21I (see an arrow indicated by a dashed line in the figure) after a certain time is elapsed from the readout/first reset period Tr1. Accordingly, the above-described Decay current Idecay is generated from the photoelectric conversion device 21.

Figure 11A:
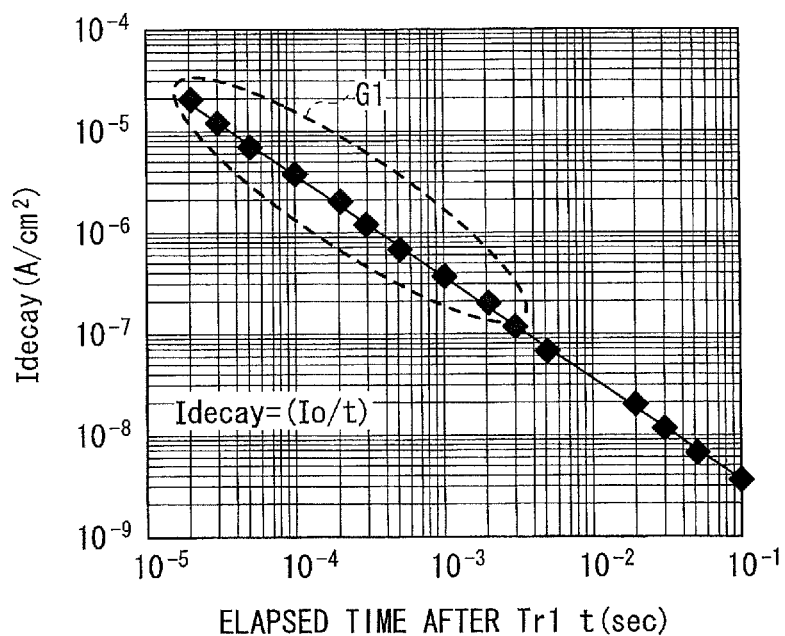
FIGS. 11A and 11B are characteristic diagrams illustrating an example of a relationship between an elapsed time after the readout/first reset period and Decay current.
Figure 11B:
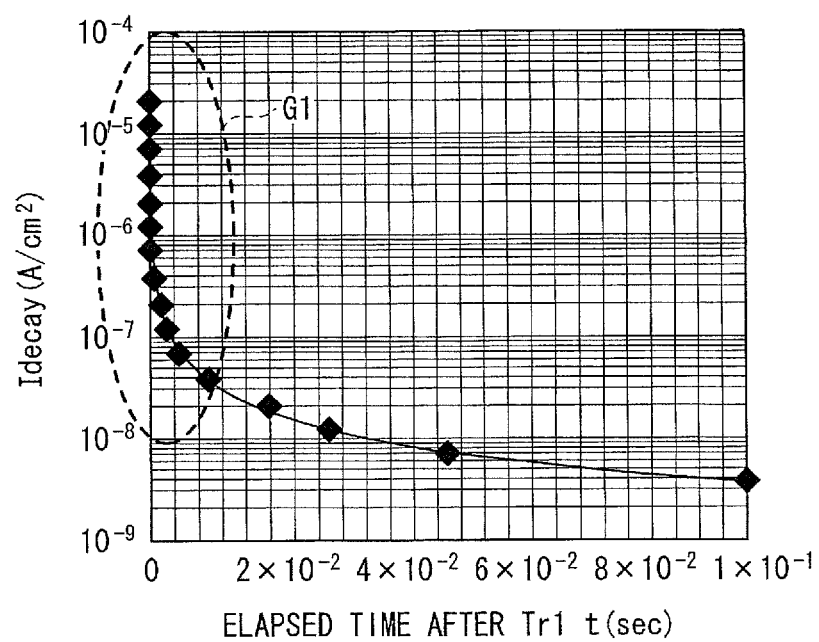
Figure 12:
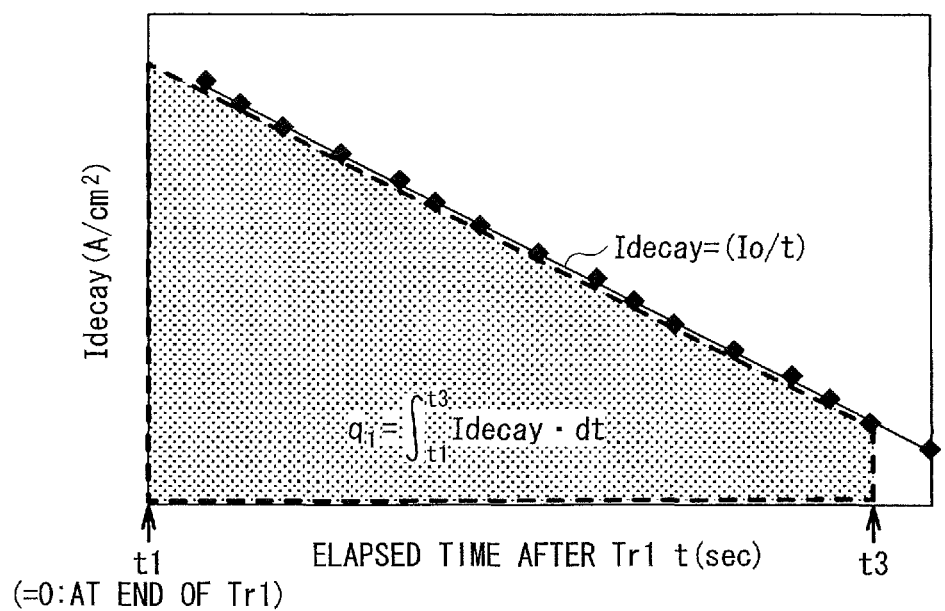
FIG. 12 is a characteristic diagram for explaining a relationship between an amount of residual charge and the Decay current.

In this case, FIGS. 11A and 11B each illustrate an example of the relationship between the Decay current Idecay and the elapsed time t after the readout/first reset period Tr1. In FIG. 11A, both the vertical axis and the lateral axis are indicated by the log scale, and in FIG. 11B, the vertical axis is indicated by the log scale and the lateral axis is indicated by the linear scale. Note that in FIGS. 11A and 11B, a part of common region of the characteristic line is indicated by a symbol G1. It is apparent from the figures that the Decay current Idecay is tend to be decreased synergistically with elapsed time from the end of the readout/first reset period Tr1 (t=0) (Idecay=($I_0$/t), where $I_0$ is a constant value). In addition, for example, as illustrated in FIG. 12, it is found that the residual charge q1 generated at this time is determined by integrating the Decay current Idecay=($I_0$/t) with the elapsed time t.

With the typical generation mechanism described above, a part of the signal charge stored before the first-time reset operation is remained in the pixel 20 (the above-described residual charge q1 is generated) even when the first-time reset operation is performed.

(4. Function of Reducing Residual Charge using Reset Operation Performed Multiple Times)

Figure 13:
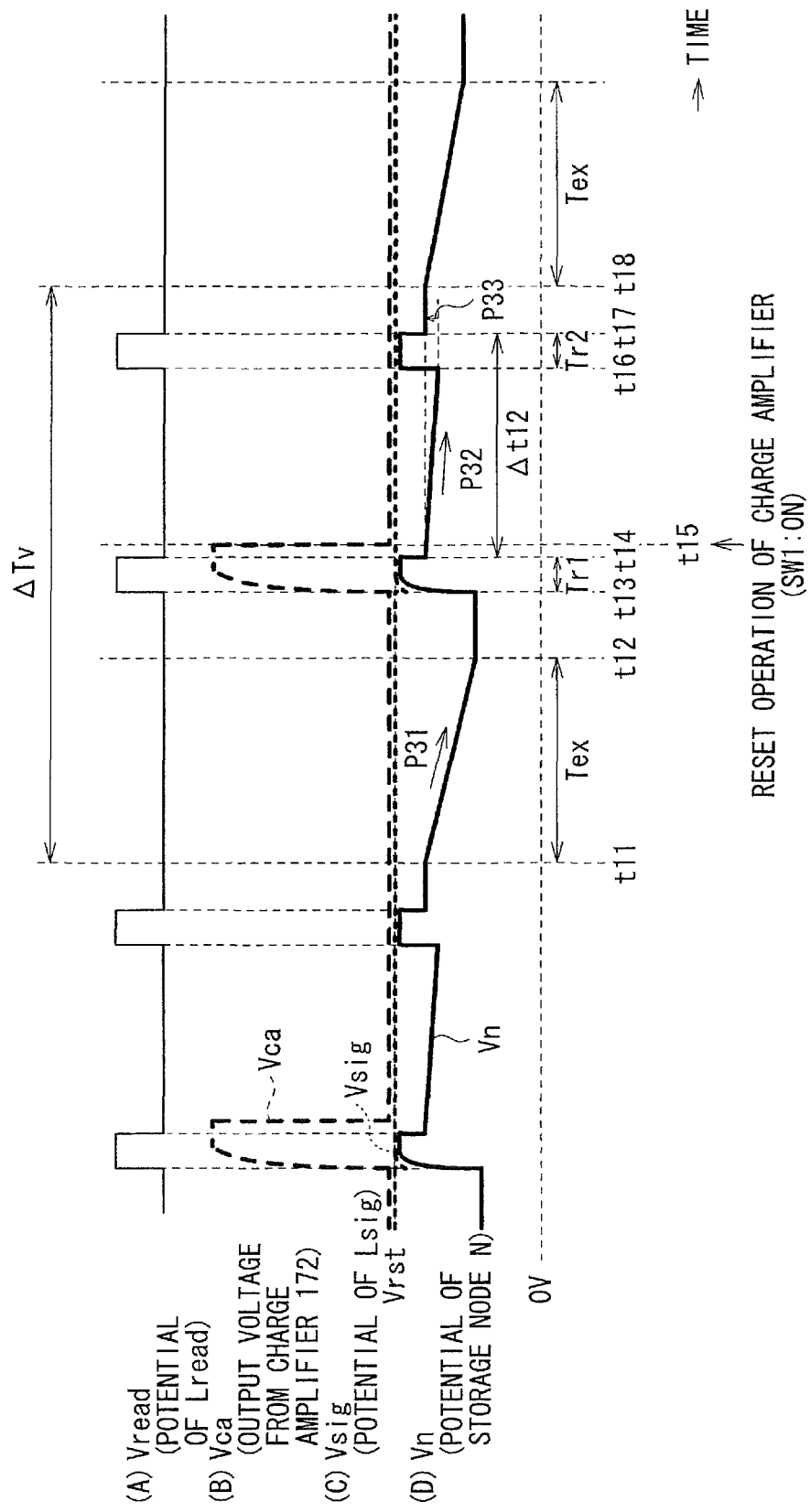
FIG. 13 is a timing waveform chart for explaining an outline of an image pickup operation according to the embodiment.

In the embodiment, as illustrated in FIG. 13, for example, the reset operation is performed multiple times (twice, herein) to reduce the residual charge, and the afterimage caused by the residual charge is thus reduced. The function of reducing the residual charge using the reset operation performed multiple times will be described in detail below.

In FIG. 13, (A) illustrates a timing waveform of the potential Vread of the readout control line Lread, (B) illustrates a timing waveform of the output voltage Vca from the charge amplifier 172, (C) illustrates a timing waveform of the potential Vsig of the signal line Lsig, and (D) illustrates a timing waveform of the potential Vn of the storage node N. These timing waveforms are in a period including one vertical period (one frame period) ΔTv.

In the frame period ΔTv, the exposure operation is performed in the exposure period Tex at timings t11 to t12, as described with reference to FIG. 6A and the like. Specifically, when the image-pickup light Lin enters the image pickup section 11, the image-pickup light Lin is converted (photoelectrically converted) into the signal charge in the photoelectric conversion device 21 in each of the pixels 20. Then, the signal charge is stored in the storage node N in the pixel 20, and the potential Vn of the signal charge is gradually varied (see an arrow P31 in FIG. 13). Incidentally, in association with the exposure operation, the potential Vn is gradually decreased from the reset voltage Vrst to 0 V. This is because the cathode of the photoelectric conversion device 21 is the storage node N in this case.

Subsequently, in the readout/first reset period Tr1 at timings t13 to t14, the readout operation and the first-time reset operation (the pixel reset operation) are performed as described with reference to FIG. 6B. Specifically, the readout operation for reading out the signal charge from the pixel 20 and the first-time reset operation for resetting the signal charge in the pixel 20 are performed substantially at the same time. However, as illustrated by an arrow P32 in FIG. 13, the potential Vn of the storage node N is gradually decreased after the first-time reset operation, and the above-described residual charge q1 is generated.

Note that, at a subsequent timing t15, the switch SW1 in the charge amplifier circuit is turned on. As a result, the charge stored in the capacitor C1 in the charge amplifier circuit is reset. In other words, the reset operation of the charge amplifier circuit (the amplifier reset operation) is performed.

After that, at subsequent timings t16 to t17, a second-time reset operation (a second reset operation) described below is performed (a second reset period Tr2).

Figure 14A:
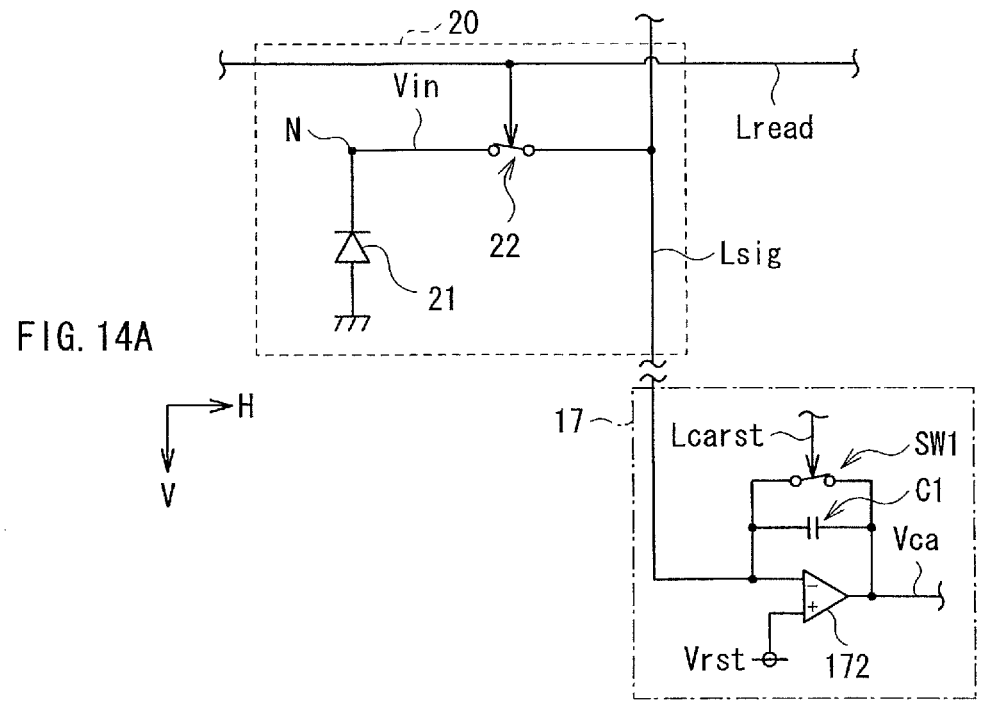
FIGS. 14A and 14B are circuit diagrams each illustrating an example of an operation state in a second reset period.

In the second reset period Tr2, the second-time reset operation is performed specifically as an first operation example illustrated in FIG. 14A. Specifically, in the first operation example, the transistor 22 in the pixel 20 is turned on and the switch SW1 in the charge amplifier circuit is also turned on. Therefore, the voltage follower circuit using the charge amplifier 172 is formed. Accordingly, the voltage of the input terminal on the negative side (signal line Lsig side) of the charge amplifier 172 is substantially equal to the reset voltage Vrst applied to the input terminal on the positive side, by the feedback characteristics of the charge amplifier 172. In this way, in the first operation example, with use of the feedback characteristics of the charge amplifier 172, the potential Vn of the storage node N in the pixel 20 is set to the reset voltage Vrst (the second-time reset operation is performed).

Figure 14B:
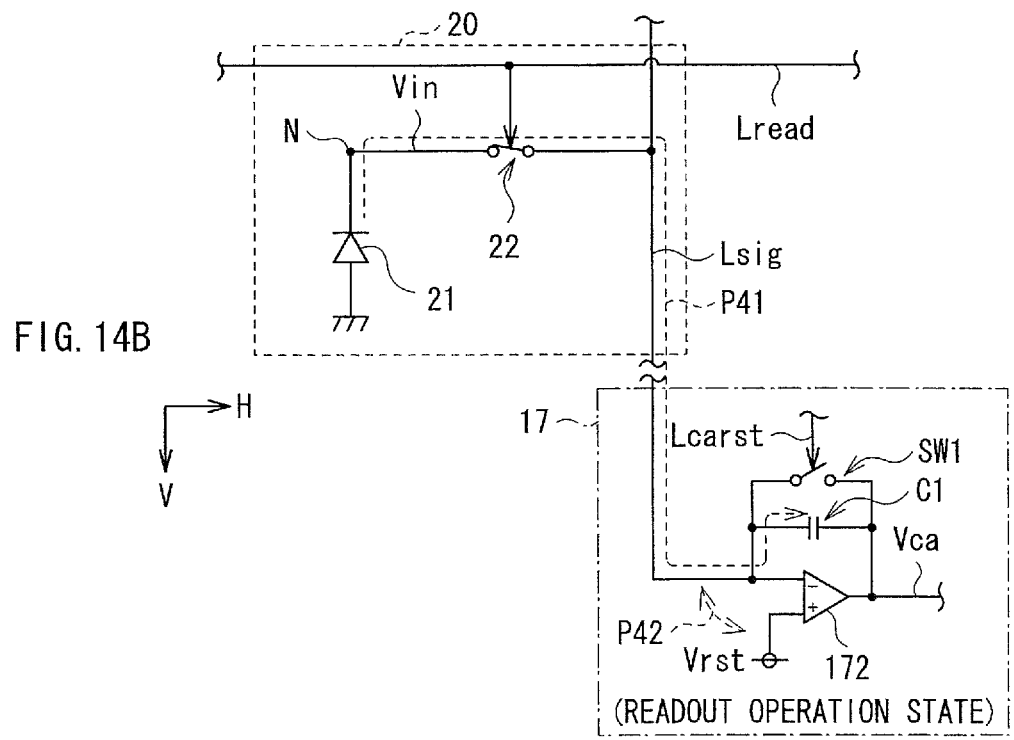

On the other hand, in the second operation example illustrated in FIG. 14B, similarly to the first-time reset operation described above, the second-time reset operation is performed with use of the imaginary short phenomenon in the charge amplifier circuit (charge amplifier 172) (see an arrow P42 in the figure). Specifically, the potential Vn of the storage node N in the pixel 20 is set to the reset voltage Vrst by the imaginary short phenomenon. Note that, at this time, since the transistor 22 in the pixel 20 is in the on state and the switch SW1 in the charge amplifier circuit is in the off state similar to in the readout/first reset period Tr1, the charge amplifier circuit is in the readout operation state. In other words, as illustrated by an arrow P41 in the figure, in the second operation example, it is possible to read out the charge remaining in the storage node N by the charge amplifier circuit.

In this way, in the embodiment, the reset operation of the stored charge in the pixel 20 (line-sequential reset drive described later) is intermittently (independently) performed multiple times during one frame period. Specifically, in this case, the first-time reset operation (the readout/first reset period Tr1) and the second-time reset operation (the second reset period Tr2) are set to be intermittently performed. Accordingly, the residual charge q1 (the remaining amount of the signal charge) in the pixel 20 after the first-time reset operation is surely reset, and such a residual charge q1 is reduced (see an arrow P33 in FIG. 13).

Figure 15:
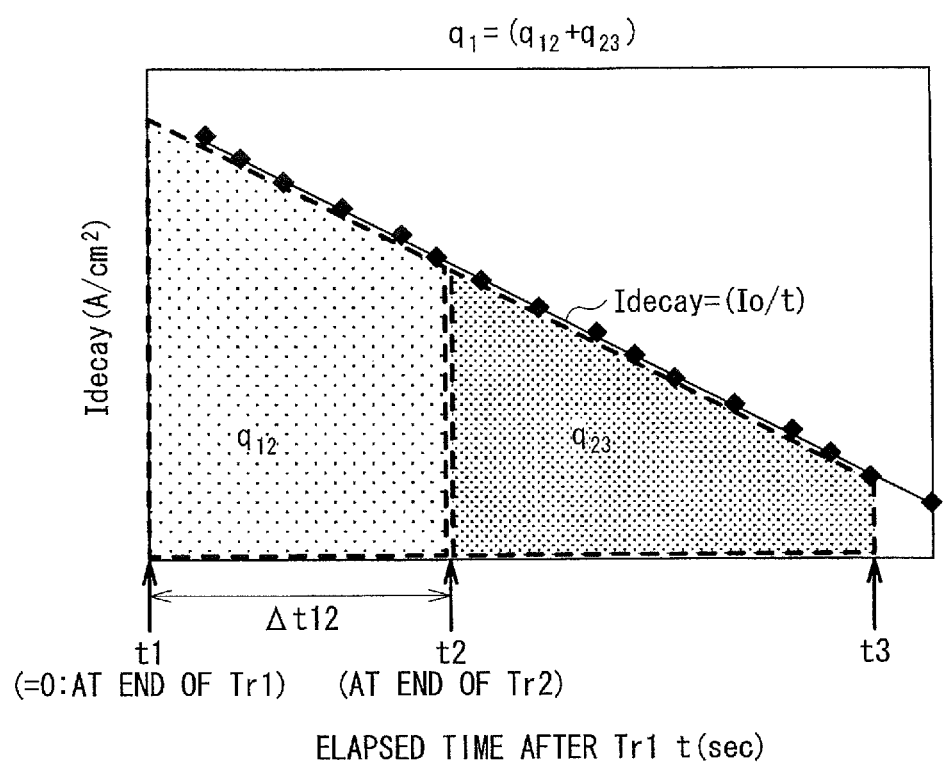
FIG. 15 is a characteristic diagram for explaining an amount of residual charge reduced by a second-time reset operation.

Specifically, assuming that the time period from the end of the first-time reset operation (the end of Tr1) to the end of the second-time reset operation (the end of Tr2) is Δt12 (see FIG. 13), the reduced amount of the charge of the generated residual charge q1 is as illustrated in FIG. 15, for example. Of the residual charge q1 described in FIG. 12, for example, a charge q12 corresponding to the integral value of the time from the beginning t1 of the time Δt12 to the end t2 thereof corresponds to the amount of the charge emitted (reduced) by the second-time reset operation. Moreover, a charge q23 calculated by the expression (q1−q12)=q23 corresponds to the amount of the charge remaining after the second-time reset operation. Accordingly, the setting is desirably performed so that the above-described time Δt12 is as long as possible. In this way, the residual charge q1 in the pixel 20 after the first-time reset operation is decreased, and as a result, occurrence of the afterimage caused by the residual charge is reduced in the subsequent readout operation (at the time of image pickup in the subsequent frame period), thereby improving the image quality.

The multiple times of reset operations (the line-sequential reset drive) is desirably performed intermittently over the period exceeding one horizontal period (one horizontal scan period; about 32 μs as an example) from the following reasons. As described above, the state transition in the PIN photodiode takes a time of about several hundreds μs. Accordingly, the reset voltage Vrst is applied continuously or intermittently to the storage node N for about 100 μs, for example, so that the generation of the residual charge is reduced. However, actually, it is confirmed from experiment and the like that the residual charge is largely decreased when the period during which the reset voltage Vrst is applied exceeds one horizontal period (for example, about 32 μs).

(5. Timing of each Reset Operation in Line-Sequential Reset Drive, and the like)

In the embodiment, as illustrated in FIG. 16 to FIG. 19, for example, timings of respective operations in the line-sequential image-pickup drive (the line-sequential readout drive and the line-sequential reset drive) are set.

Figure 16:
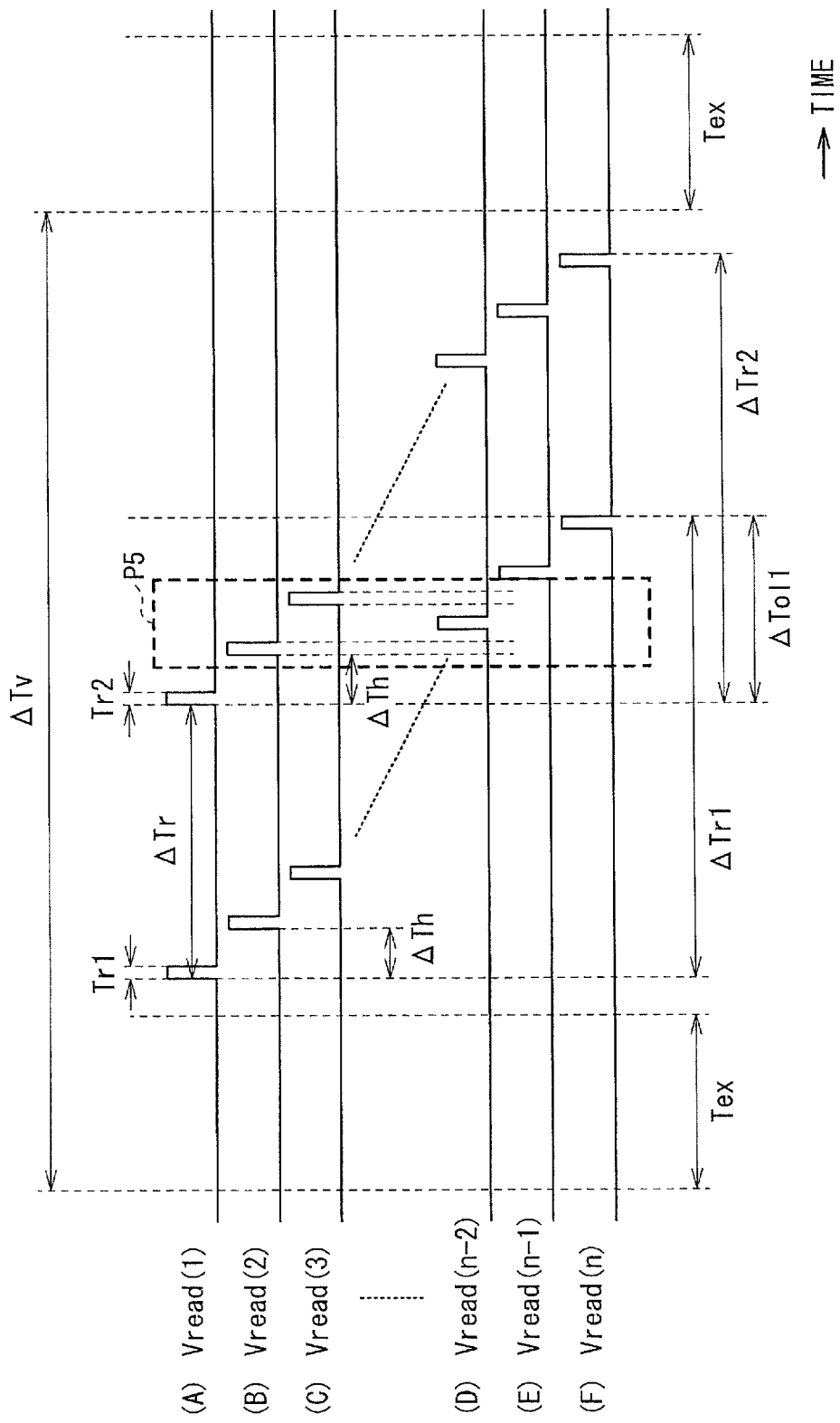
FIG. 16 is a timing waveform chart illustrating an example of a line-sequential image-pickup drive according to the embodiment.

FIG. 16 is a timing waveform chart illustrating an example of the line-sequential image-pickup drive according to the embodiment. Herein, (A) to (F) illustrate timing waveforms of the potentials Vread(1) to Vread(3) and Vread(n−2) to Vread(n) of the readout control lines Lread(1) to Lread(3) and Lread(n−2) to Lread(n), respectively. In addition, ΔTh illustrated in the figure indicates one horizontal period (one horizontal scan period). Note that, in FIG. 17 to FIG. 19 described later, the case of the first operation example ((D) of each figures) of the potential Vcarst of the amplifier reset control line Lcarst and the case of the second operation example ((E) of each figure) thereof are illustrated.

It is apparent from (A) to (F) of FIG. 16, an overlap period (a drive overlap period ΔTol1) is partially present in the drive period in which the first-time reset operation and the like (the operation in the readout/first reset period Tr1) are line-sequentially performed (the line-sequential drive period ΔTr1) and in the drive period in which the second-time reset operation is line-sequentially performed (the line-sequential drive period ΔTr2).

In the embodiment, each of the reset operation periods (the readout/first reset period Tr1 and the second reset period Tr2) in the drive overlap period ΔTol1 is set as follows. Specifically, each of the reset operations (each of the readout/first reset periods Tr1 in the line-sequential drive period ΔTr1) at the time of the first-time line-sequential reset drive and each of the reset operations (each of the second reset periods Tr2 in the line-sequential drive period ΔTr2) at the time of the second-time line-sequential reset drive are set as follows. A non-overlap period during which each of the readout/first reset periods Tr1 in the line sequential drive period ΔTr1 does not overlap with any of the second reset periods Tr2 in the line-sequential drive period ΔTr2 is set to be present at least in part (for example, refer to a period illustrated by a symbol P5 in FIG. 16).

To be more specific, in the example of the timing waveforms (enlarged waveforms near the period indicated by the symbol P5) illustrated in (A) to (E) of FIG. 17 in an enlarged manner, each of the reset operation periods is set as follows. In this example, all of the readout/first reset periods Tr1 and the second reset periods Tr2 in the drive overlap period ΔTol1 correspond to the above-described non-overlap period. In other words, each of the readout/first reset periods Tr1 and each of the second reset periods Tr2 do not overlap with each other at all. Incidentally, in this example, during the period indicated by the symbol P5, the potential Vread corresponding to the row scan signal is applied to Vread(2) (the second reset period Tr2), Vread(n−2) (the readout/first reset period Tr1), and Vread(3) (the second reset period Tr2) in this order.

Figure 17:
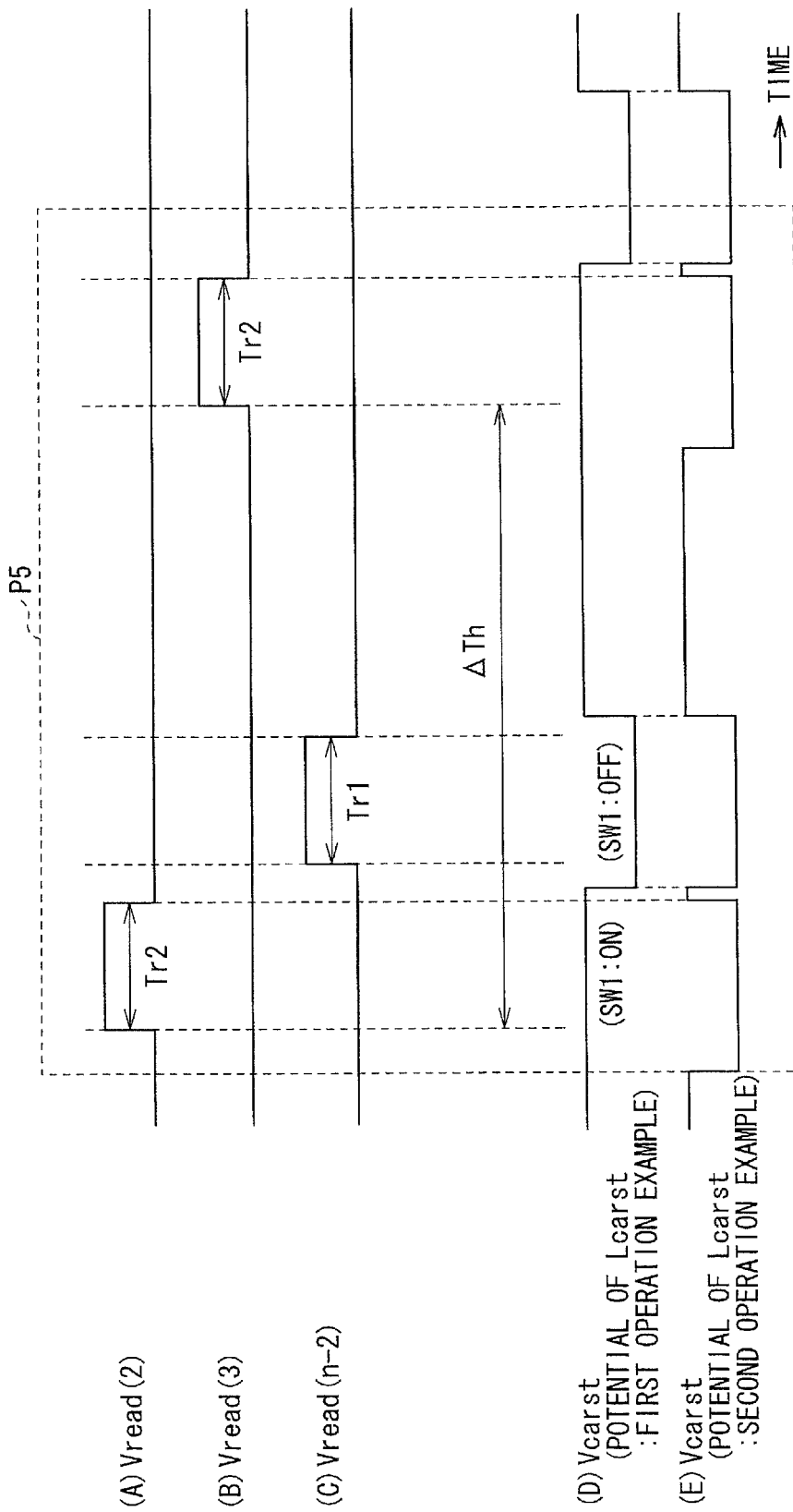
FIG. 17 is a timing waveform chart illustrating a part of the line-sequential image-pickup drive illustrated in FIG. 16 in an enlarged manner.
Figure 18:
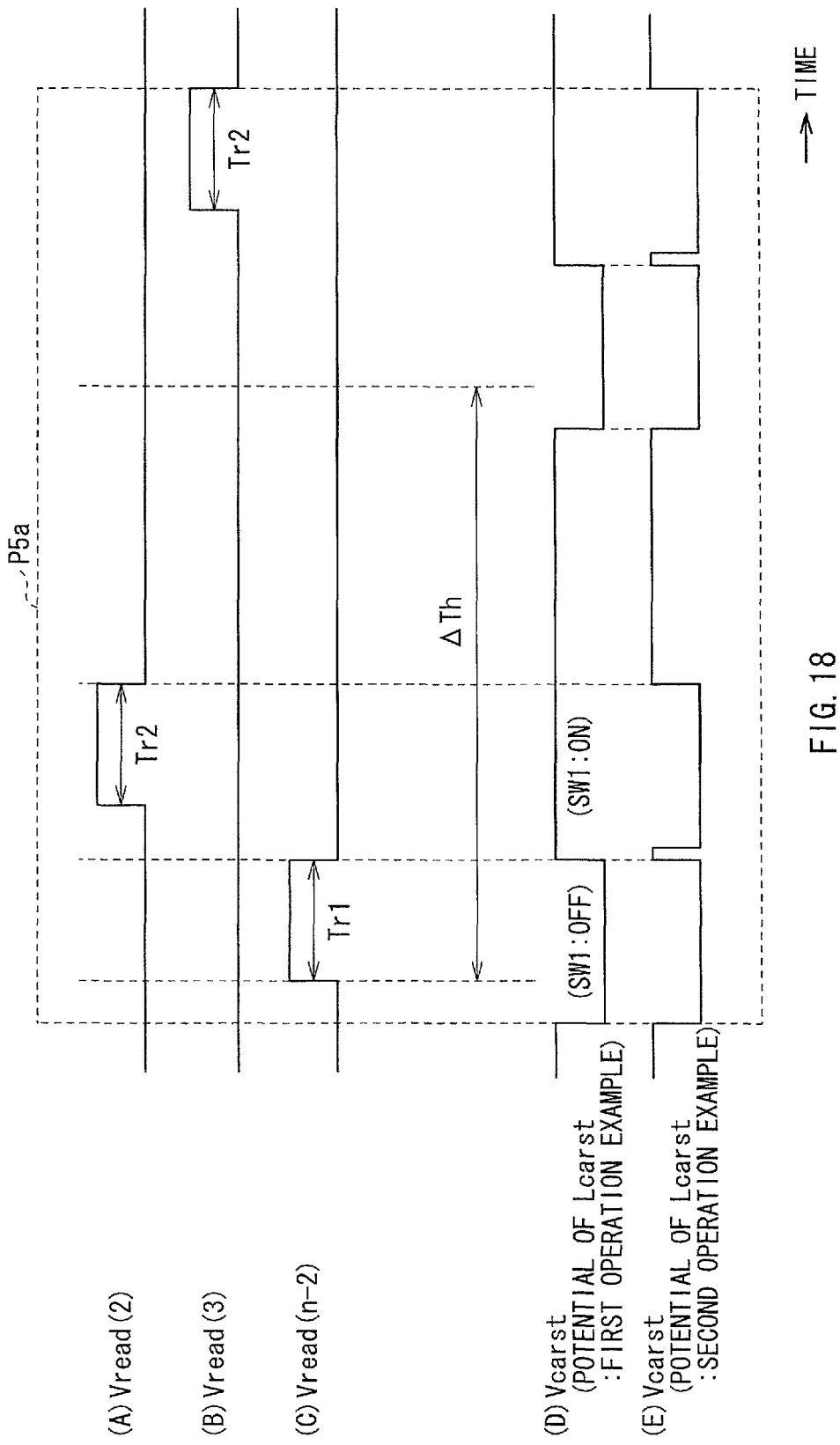
FIG. 18 is a timing waveform chart illustrating another example of the line-sequential image-pickup drive according to the embodiment.

On the other hand, during the period indicated by a symbol P5a in (A) to (E) of FIG. 18, unlike the period indicated by the symbol P5 in FIG. 16 and FIG. 17, the potential Vread corresponding to the row scan signal is applied to Vread(n−2) (the readout/first reset period Tr1), Vread(2) (the second reset period Tr2), and Vread(3) (the second reset period Tr2) in this order. However, also in this case, similar to the period of the symbol P5, all of the readout/first reset periods Tr1 and the second reset periods Tr2 in the drive overlap period ΔTol1 correspond to the above-described non-overlap period.

Moreover, in a period indicated by a symbol P5b in (A) to (E) of FIG. 19, for example, unlike the periods indicated by the symbols P5 and P5a in FIG. 16 to FIG. 18, each of the reset operation periods is set as follows. The above-described non-overlap period is provided in a part of the readout/first reset period Tr1 and the second reset period Tr2 in the drive overlap period ΔTol1. In other words, as illustrated in the figure, an overlap period (an operation overlap period ΔTol2) is present in a part of the readout/first reset period Tr1 and the second reset period Tr2. However, also in this case, since such an operation overlap period ΔTol2 is partially provided, the above-described non-overlap period is present in part.

Herein, the timings and the like of the respective operations in such a line-sequential image-pickup drive (the line-sequential readout drive and the line-sequential reset drive) are realized by the row scan section 13 having the unit circuits 130 illustrated in FIG. 4, for example. Specifically, the timings and the like of the respective operations in such a line-sequential image-pickup drive are realized by the plurality of shift resistor circuits 131 and 132 provided to correspond to the number of executions of the line-sequential reset drive and the logical circuits (the AND circuits 133A to 133D and the OR circuits 134A and 134B) which generates logical sum signals between output signals from the shift resistor circuits 131 and 132 while controlling the valid period of each of the output signals.

Figure 20:
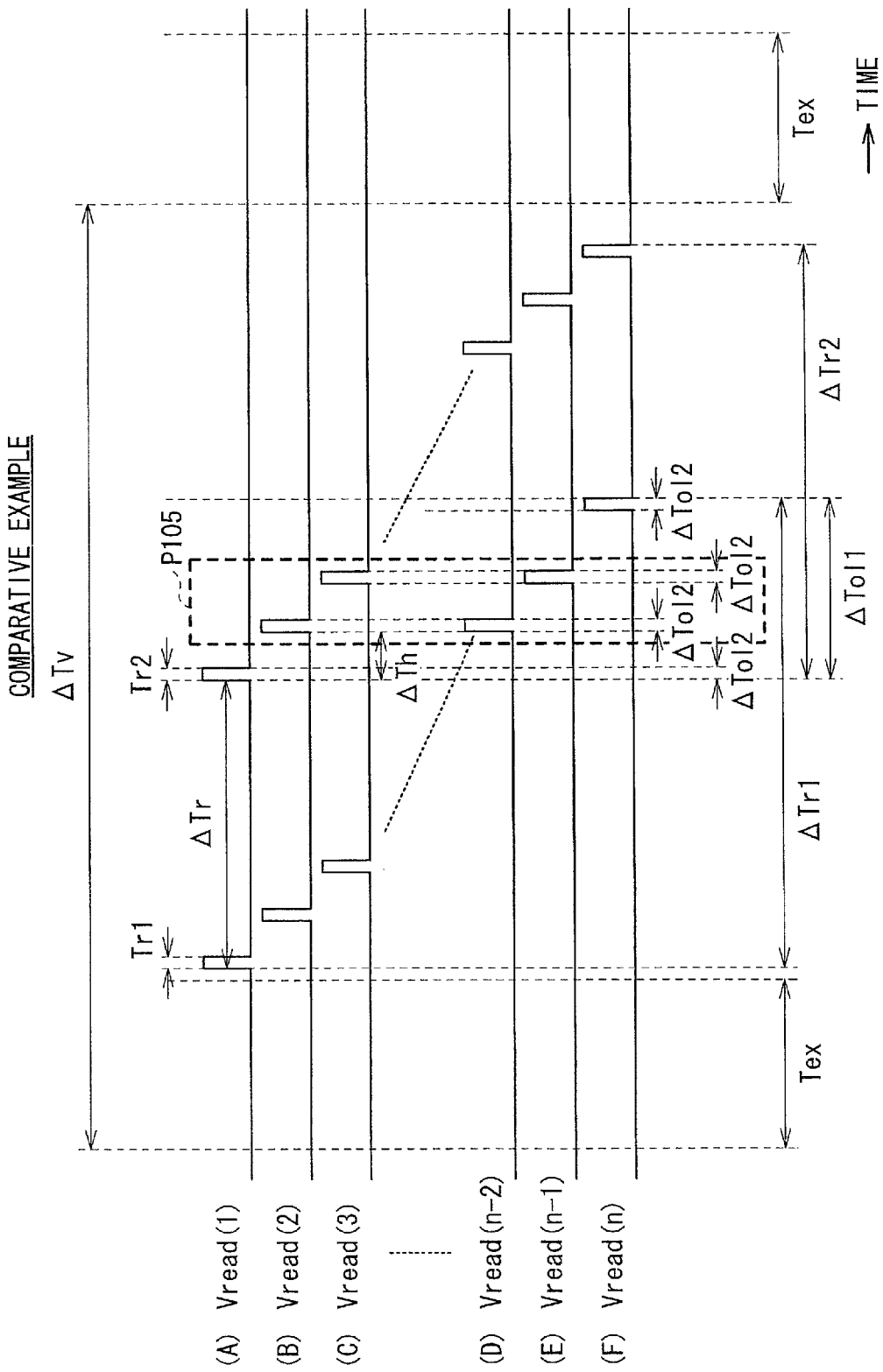
FIG. 20 is a timing waveform chart illustrating a line-sequential image-pickup drive according to a comparative example.

As described above, in the embodiment, the above-described non-overlap period is set to be present at least in part of the reset operation periods (the readout/first reset period Tr1 and the second reset period Tr2) in the drive overlap period ΔTol1 during which the line-sequential drive period ΔTr1 and the line-sequential drive period ΔTr2 are overlapped. Accordingly, unlike a comparative example illustrated in (A) to (F) of FIG. 20 (a non-overlap period is not provided at all in the reset operation periods in the drive overlap period ΔTol1, or all of the readout/first reset periods Tr1 are overlapped with the second reset periods Tr2 in the drive overlap period ΔTol1), the periods, the timings, and the like of the reset operations in the multiple times of line-sequential reset drives are allowed to be arbitrarily set.

Note that, as compared with the row scan section 13 of the embodiment, which realizes such operation timings and the like, in a standard row scan circuit (gate driver circuit) in related art, it is difficult to perform operations performed in pixels which are connected to different scan lines, at the timings not partially overlapped, or the like.

Figure 19:
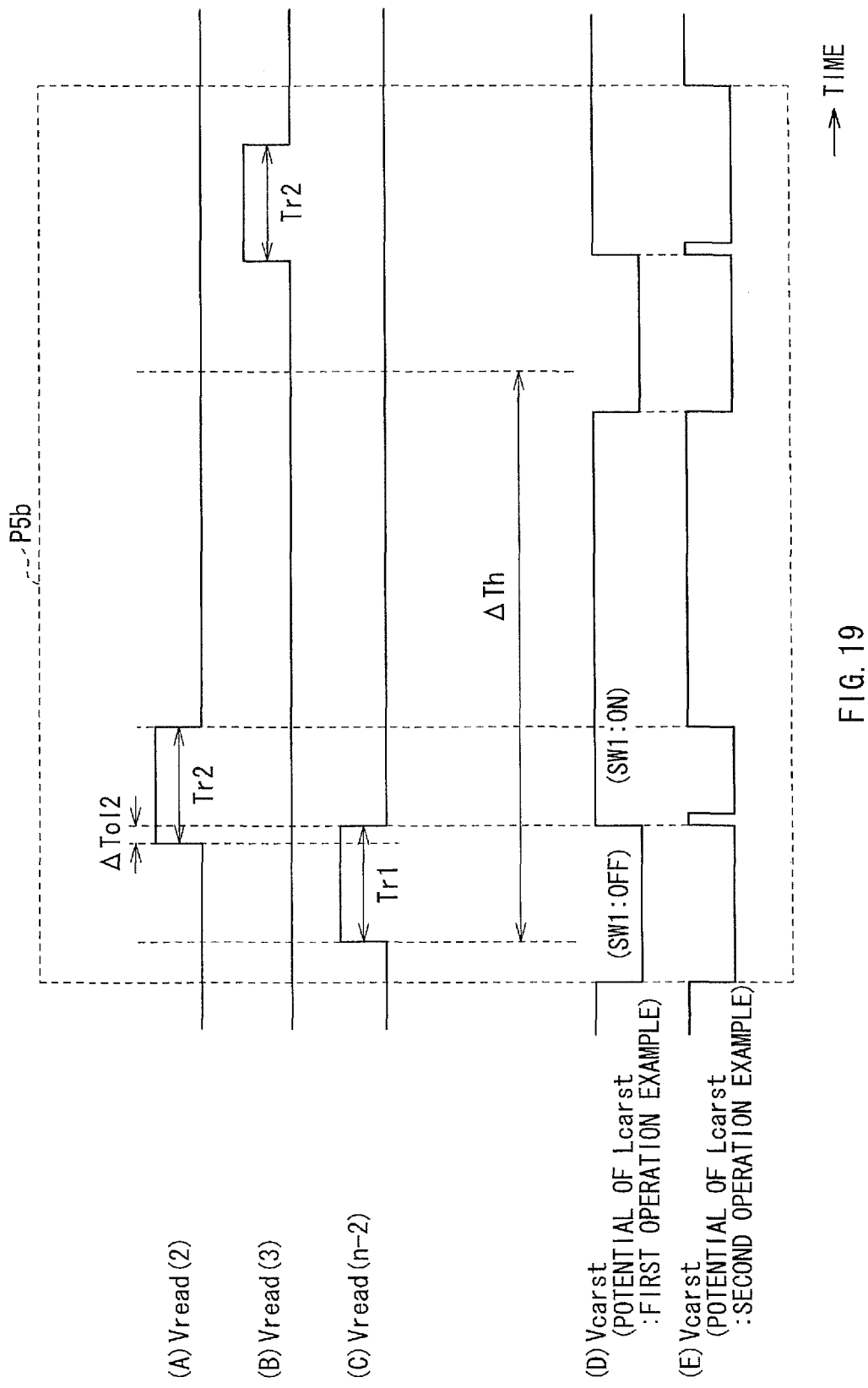
FIG. 19 is a timing waveform chart illustrating still another example of the line-sequential image-pickup drive according to the embodiment.

In addition, specifically as an example illustrated in FIG. 19, in the case where a non-overlap period is provided in a part of the readout/first reset period Tr1 and the second reset period Tr2 in the drive overlap period ΔTol1, the following is also true. Specifically, as illustrated in FIG. 16 to FIG. 18, for example, in such a case, speeding up of the line-sequential image-pickup drive is realized (frame rate is increased), compared with the case where all of the readout/first reset periods Tr1 and the second reset periods Tr2 in the drive overlap period ΔTol1 correspond to the non-overlap period.

As described above, in the embodiment, the above-described non-overlap period is provided at least in a part of the reset operation periods in the drive overlap period ΔTol1 at the time of the multiple times of the line-sequential reset drives. Therefore, the periods, the timings, and the like of the reset operations at the time of the multiple times of the line-sequential reset drives are allowed to be arbitrarily set. Consequently, the degree of freedom of the operation at the time of image-pickup drive (line-sequential image-pickup drive) is allowed to be improved, and thus the image-pickup drive is allowed to be performed at optimal timings.

In addition, in the case where the non-overlap period is provided only in a part of the reset operation periods in the drive overlap period ΔTol1, it is possible to realize the speeding up of the line-sequential image-pickup drive (to increase the frame rate).

Modifications

Subsequently, modifications (modifications 1 to 5) of the above-described embodiment will be described. Note that like numerals are used to designate substantially like components in the embodiment, and the description thereof will be appropriately omitted.

Modification 1

Figure 21:
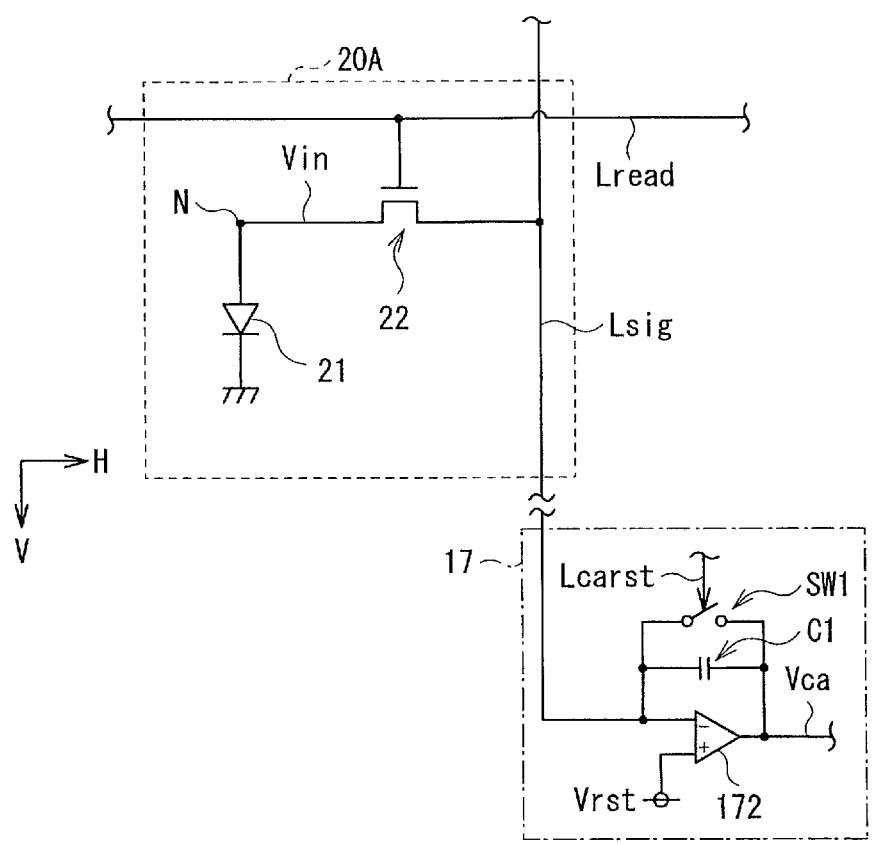
FIG. 21 is a circuit diagram illustrating a configuration of a pixel and the like according to a modification 1.

FIG. 21 illustrates a circuit configuration of a pixel (a pixel 20A) according to the modification 1, together with the circuit configuration example of the column selection section 17 described in the above-described embodiment. The pixel 20A of the modification 1 has a passive circuit configuration similar to the pixel 20 of the embodiment, and has one photoelectric conversion device 21 and one transistor 22. In addition, similar to the pixel 20, the pixel 20A is connected with the readout control line Lread extending along the H direction and the signal line Lsig extending along the V direction.

In the pixel 20A, however, the photoelectric conversion device 21 is disposed in a direction opposite to that of the photoelectric conversion device 21 in the pixel 20. In other words, in the pixel 20A, the anode of the photoelectric conversion device 21 is connected to the storage node N, and the cathode thereof is grounded.

Also in the image pickup unit having the pixel 20A with such a configuration, similar effects to the image pickup unit 1 of the embodiment are provided by similar function to the image pickup unit 1.

Modifications 2 and 3

(Circuit Configuration)

Figure 22:
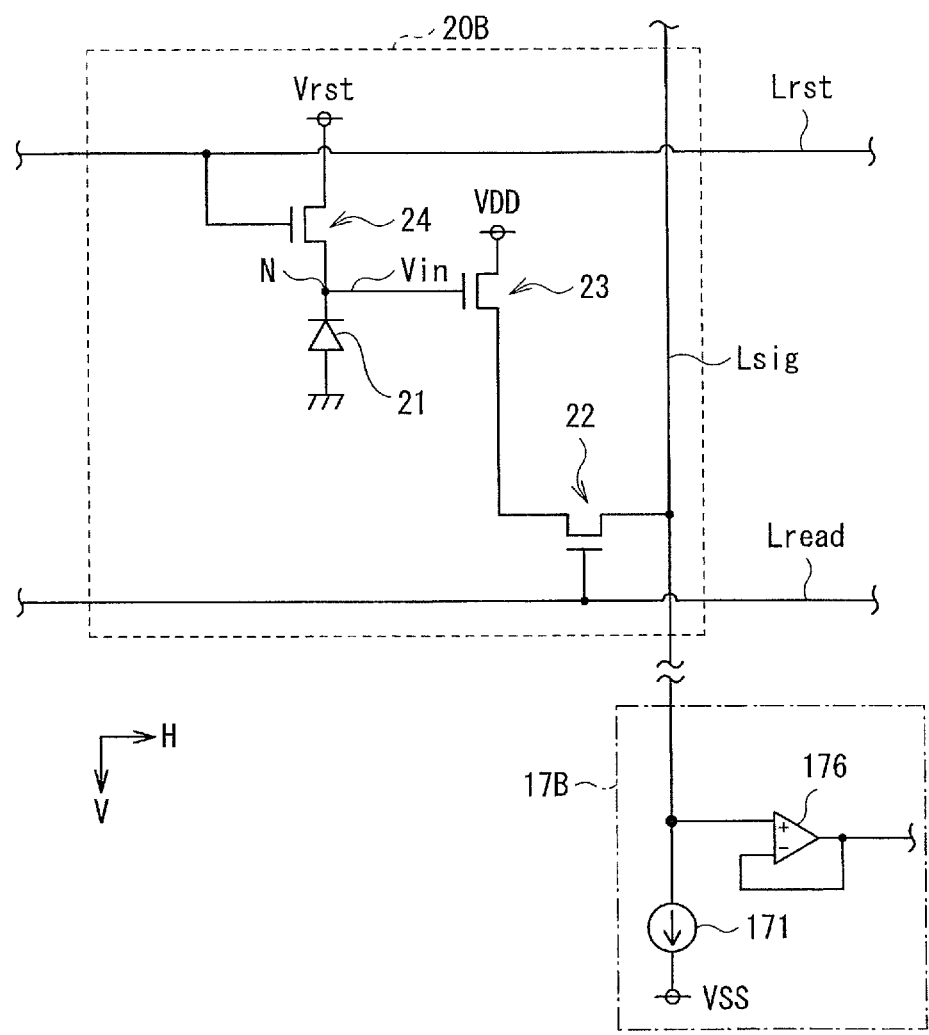
FIG. 22 is a circuit diagram illustrating a configuration of a pixel and the like according to a modification 2.
Figure 23:
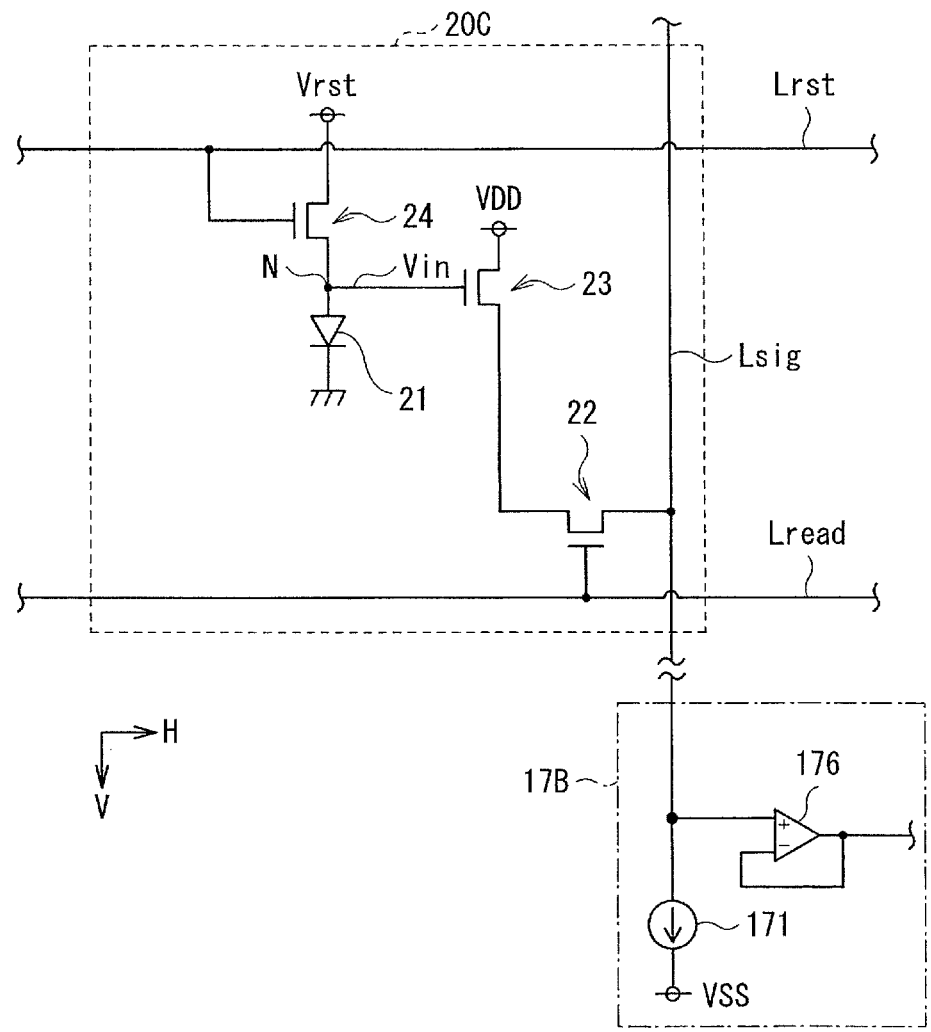
FIG. 23 is a circuit diagram illustrating a configuration of a pixel and the like according to a modification 3.

FIG. 22 illustrates a circuit configuration of a pixel (a pixel 20B) according to the modification 2, together with a circuit configuration example of a column selection section 17B described below. In addition, FIG. 23 illustrates a circuit configuration of a pixel (a pixel 20C) according to the modification 3, together with the circuit configuration example of the column selection section 17B. Each of the pixels 20B and 20C of the modifications 2 and 3 has a so-called active circuit configuration, unlike the pixels 20 and 20A described hereinbefore.

Specifically, in each of the active-type pixels 20B and 20C, one photoelectric conversion device 21 and three transistors 22, 23, and 24 are provided. To each of the pixels 20B and 20C, the readout control line Lread and the reset control line Lrst extending along the H direction and the signal line Lsig extending along the V direction are connected.

In each of the pixels 20B and 20C, the gate of the transistor 22 is connected to the readout control line Lread, the source thereof is connected to the signal line Lsig, and the drain thereof is connected to a drain of the transistor 23 configuring a source follower circuit. A source of the transistor 23 is connected to a power source VDD, and a gate thereof is connected to a cathode (the pixel 20B illustrated in FIG. 22) or an anode (the pixel 20C illustrated in FIG. 23) (the storage node N) of the photoelectric conversion device 21, and to a drain of the transistor 24 functioning as a reset transistor. A gate of the transistor 24 is connected to the reset control line Lrst, and a source thereof is supplied with the reset voltage Vrst. The anode (the pixel 20B) or the cathode (the pixel 20C) of the photoelectric conversion device 21 is grounded.

Moreover, the column selection section 17B according to the modifications 2 and 3 illustrated in FIG. 22 and FIG. 23 is configured by providing a constant current source 171 and an amplifier 176 to the above-described column selection section 17, in place of the charge amplifier 172, the capacitor C1, and the switch SW1. In the amplifier 176, an input terminal on a positive side is connected to the signal line Lsig, and an input terminal and an output terminal on a negative side are connected to each other, thereby forming a voltage follower circuit. Note that, a first terminal of the constant current source 171 is connected to one end of the signal line Lsig, and a second terminal thereof is connected to the power source VSS.

(Functions and Effects)

In such an image pickup device of the modifications 2 and 3 with the pixel 20B or 20C which has the active circuit configuration, the image pickup operation (line-sequential image-pickup drive) is performed in the following way.

First, in the image pickup device with the pixel 20 or 20A which has the passive circuit configuration described hereinbefore, the line-sequential image-pickup drive is performed as illustrated in FIG. 24A, for example. Specifically, the line-sequential readout drive and the line-sequential reset drive are performed substantially at the same time by a single line-sequential drive (drive for performing the line-sequential operation in the readout/first reset period Tr1).

On the other hand, in the image pickup unit with the pixel 20B or 20C which has the active circuit configuration as the modifications 2 and 3, the line-sequential image-pickup drive is performed in a manner illustrated in FIG. 24B, for example. Specifically, the line-sequential readout drive and each time of (first-time and second-time, herein) the line sequential reset drive are independently and separately performed. In other words, the line-sequential readout drive for performing the line-sequential operation in the readout period Tr1, the first-time line-sequential reset drive for performing the line-sequential operation in the first-time reset period (first reset period Tr1b), and the second-time line-sequential reset drive for performing the line-sequential operation in the second-time reset period (the second reset period Tr2) are independently and separately performed. Incidentally, in the case of the active circuit configuration, the reset operation in each time of the line-sequential drive is performed by turning on the transistor 24 which functions as the reset transistor.

As described above, the same as the case of the passive circuit configuration described hereinbefore is true for the image pickup unit with the pixel 20B or 20C which has the active circuit configuration. Specifically, when the above-described non-overlap period is provided at least in a part of the reset operation periods in the drive overlap period $\Delta$To11, the periods, the timings, and the like of the reset operations at the time of the line-sequential reset drive are allowed to be arbitrarily set. Therefore, also in this case, degree of freedom of the operation at the time of the image-pickup drive (the line-sequential image-pickup drive) is allowed to be improved, and thus the image-pickup drive is allowed to be performed at the optimum timings, and the like.

Modifications 4 and 5

Figure 25A:
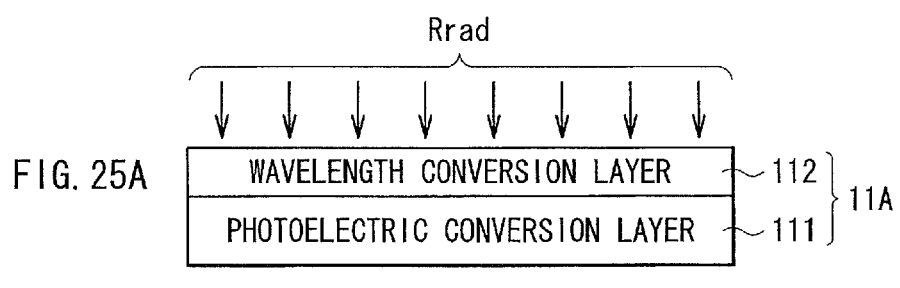
FIGS. 25A and 25B are schematic diagrams illustrating a schematic configuration of an image pickup section according to modifications 4 and 5, respectively.
Figure 25B:
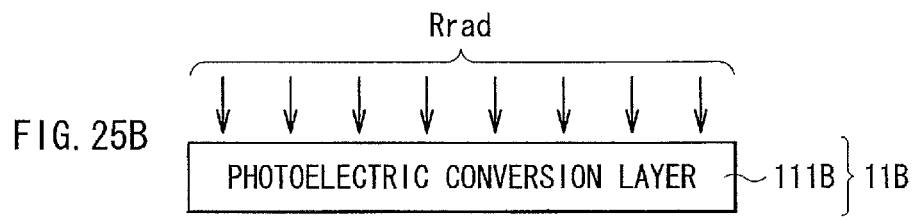

FIGS. 25A and 25B schematically illustrate an outline configuration of an image pickup section (image pickup sections 11A and 11B) according to the modifications 4 and 5, respectively.

The image pickup section 11A according to the modification 4 illustrated in FIG. 25A has a wavelength conversion layer 112, in addition to the photoelectric conversion layer 111 described in the embodiment. Specifically, the wavelength conversion layer 112 is provided on the photoelectric conversion layer 111 (on a side close to a light receiving surface (an image pickup surface) of the image pickup section 11A).

The wavelength conversion layer 112 converts the wavelength of the radiation Rrad ($\alpha$-ray, $\beta$-ray, $\gamma$-ray, X-ray, and the like) into the wavelength in the sensitive range of the photoelectric conversion layer 111. Accordingly, in the photoelectric conversion layer 111, information based on the radiation Rrad is allowed to be read. The wavelength conversion layer 112 is formed of, for example, a fluorescent body (for example, a scintillator) which converts radiation such as X-ray into visible light. Such a wavelength conversion layer 112 is obtained by forming an organic planarization film or a planarization film made of spin on glass or the like on the top of the photoelectric conversion layer 111 and forming a fluorescent film made of CsI, NaI, $CaF_2$, or the like on the top of the planarization film.

On the other hand, the image pickup section 11B according to the modification 5 illustrated in FIG. 25B has a photoelectric conversion layer 111B, instead of the photoelectric conversion layer 111 described in the embodiment. The photoelectric conversion layer 111B directly generates an electrical signal based on the incident radiation Rrad. Specifically, the image pickup section 11A of the modification 4 illustrated in FIG. 25A is applied to a so-called indirect-type radiation image pickup unit, whereas the image pickup section 11B of the modification 5 is applied to a so-called direct-type radiation image pickup unit. Note that the photoelectric conversion layer 111B applied to the direct-type radiation image pickup unit is configured of an amorphous selenium (a-Se) semiconductor, a cadmium tellurium (CdTe) semiconductor, or the like.

In the image pickup unit according to the modifications 4 and 5 with the image pickup section 11A or 11B having such a configuration, the image pickup sections 11A and 11B generate an electrical signal based on the incident radiation Rrad, thereby configuring the radiation image pickup unit. Such a radiation image pickup unit is applicable to medical instruments (X-ray image pickup unit such as digital radiography), X-ray inspection apparatuses for personal effects used at air ports and the like, industrial X-ray image pickup units (apparatuses for examination of dangerous goods in a container, examination of contents in a bag or the like), and the like.

Application Example

Application example of any of the image pickup units according to the above-described embodiment and the above-described modifications (the modifications 1 to 5) to an image-pickup and display system will be described now.

Figure 26:
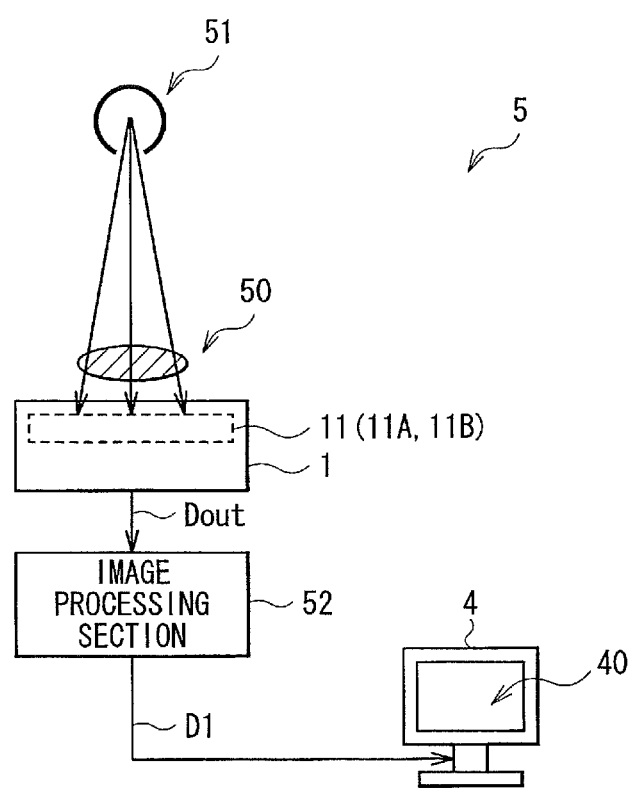
FIG. 26 is a schematic diagram illustrating a schematic configuration of an image-pickup and display system according to an application example.

FIG. 26 schematically illustrates an outline configuration example of an image-pickup and display system (an image-pickup and display system 5) according to the application example. The image-pickup and display system 5 includes the image pickup unit 1 having the image pickup section 11 (or 11A or 11B) according to any of the above-described embodiment and the like, an image processing section 52, and a display 4, and in this example, is configured as an image-pickup and display system using radiation (a radiation image-pickup and display system).

The image processing section 52 performs a predetermined image process on the output data Dout (the image pickup signal) output from the image pickup unit 1 to generate image data D1. The display 4 displays an image based on the image data D1 generated by the image processing section 52 on a predetermined monitor screen 40.

In the image-pickup and display system 5 with such a configuration, the image pickup unit 1 (herein, the radiation image pickup unit) acquires the image data Dout of a subject 50, based on irradiation light (herein, radiation) irradiated toward the subject 50 from a light source 51 (herein, a radiation source such as an X-ray source), and then outputs the image data Dout to the image processing section 52. The image processing section 52 performs the above-described predetermined image process on the input image data Dout, and then outputs the processed image data (display data) D1 to the display 4. The display 4 displays image information (captured image) on the monitor screen 40, based on the input image data D1.

In this way, in the image-pickup and display system 5 of the application example, since the image pickup unit 1 is allowed to acquire the image of the subject 50 as an electrical signal, image display is allowed to be performed by transmitting the acquired electrical signal to the display 4. In other words, the image of the subject 50 is allowed to be observed without using existing radiation photo films, and it is possible to take and display pictures.

Incidentally, in the application example, the case where the image pickup unit 1 is configured as a radiation image pickup unit and the image-pickup and display system uses radiation has been described as an example. However, the image-pickup and display system of the disclosure is applicable to an image-pickup and display system using an image pickup unit of other methods.

Other Modifications

Hereinbefore, although the technology of the disclosure has been described with referring to the embodiment, the modifications, and the application example, the technology is not limited to the embodiment and the like, and various modifications may be made.

For example, the circuit configuration of the pixel in the image pickup section is not limited to the circuit configuration described in the above-described embodiment and the like (the circuit configuration of the pixels 20 and 20A to 20C), and the other circuit configurations may be available. Similarly, the circuit configuration of each of the row scan section, the column selection section, and the like is not limited to the circuit configuration described in the above-described embodiment and the like, and the other circuit configurations may be available.

Moreover, in the above-described embodiment and the like, although the case where the line-sequential reset drive is performed twice during one frame period is described as an example, this is not limitative. The line-sequential reset drive may be performed three times or more during one frame period.

Furthermore, the image pickup section, the row scan section, the A/D conversion section (the column selection section), the column scan section, and the like which are described in the above-described embodiment and the like may be formed on the same substrate, for example. Specifically, for example, with use of a polycrystalline semiconductor such as low-temperature polycrystalline silicon, the switches and the like in the circuits may be formed on the same substrate. Therefore, drive operation on the same substrate is allowed to be performed based on the control signal from an external system control section, thereby realizing improvement of reliability at the time of decreasing frame size or wiring connection.

Note that the technology may be configured as follows.

(1) An image pickup unit including:
an image pickup section including a plurality of pixels, each of the pixels including a photoelectric conversion device; and
a drive section performing a line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset, wherein
the drive section intermittently performs the line-sequential reset drive multiple times during one frame period, to allow a non-overlap period to be provided at least in part of the reset operation periods in an overlap period, the overlap period being a period during which a drive period of one of the multiple line-sequential reset drives and a drive period of one of the remaining multiple line-sequential reset drives are overlapped, and the non-overlap period being a period during which each of the reset operations by the one of the multiple line-sequential drives is not overlapped with any of the reset operations by the one of the remaining multiple line-sequential reset drives.

(2) The image pickup unit according to (1), wherein the non-overlap period is provided only in a part of the periods of the reset operation in the overlap period.

(3) The image pickup unit according to (1), wherein all of the periods of the reset operations in the overlap period correspond to the non-overlap period.

(4) The image pickup unit according to any one of (1) to (3), wherein the drive section includes a scan section performing line-sequential scanning with respect to the plurality of pixels at the time of the line-sequential readout drive and the line-sequential reset drive.

(5) The image pickup unit according to (4), wherein the scan section includes a plurality of columns of shift resistor circuit sections provided to correspond to the number of executions of the line-sequential reset drive, and a logic circuit generating logical sum signals of output signals from each of the columns of the shift resistor circuit sections while controlling a valid period of each of the output signals.

(6) The image pickup unit according to any one of (1) to (5), wherein the line-sequential readout drive and a first-time line sequential reset drive are performed by a single line-sequential drive at a time.

(7) The image pickup unit according to (6), wherein
the drive section includes a charge amplifier, a first input terminal of the charge amplifier being connected to a signal line used at the time of the readout operation, a second input terminal of the charge amplifier being supplied with a predetermined reset voltage, and
the reset operation at the time of the first-time line-sequential reset drive is performed with use of an imaginary short phenomenon in the charge amplifier.

(8) The image pickup unit according to (7), wherein the reset operation at the time of the second-time and subsequent line-sequential reset drive is performed with use of a feedback characteristic or an imaginary short phenomenon in the charge amplifier.

(9) The image pickup unit according to any one of (1) to (5), wherein the line-sequential readout drive and each time of the line-sequential reset drive are independently and separately performed.

(10) The image pickup unit according to (9), wherein
each of the pixels includes a reset transistor, and
the reset operation at the time of each time of the line-sequential reset drive is performed by turning on the reset transistor.

(11) The image pickup unit according to any one of (1) to (10), wherein the line-sequential reset drive is intermittently performed multiple times over a period exceeding one horizontal period.

(12) The image pickup unit according to (1) to (11), wherein the photoelectric conversion device is formed of a PIN photodiode.

(13) The image pickup unit according to any one of (1) to (12), wherein the image pickup section generates an electrical signal based on incident radiation, and
the image pickup unit is configured as a radiation image pickup unit.

(14) The image pickup unit according to (13), wherein the image pickup section includes a photoelectric conversion layer configuring the photoelectric conversion device, and a wavelength conversion layer converting a wavelength of the radiation into a wavelength in a sensitive range of the photoelectric conversion layer.

(15) The image pickup unit according to (13), wherein the image pickup section includes a photoelectric conversion layer, the photoelectric conversion layer configuring the photoelectric conversion device and directly generating the electrical signal based on the radiation.

(16) The image pickup unit according to any one of (13) to (15), wherein the radiation is an X-ray.

(17) An image-pickup and display system including an image pickup unit and a display displaying an image based on an image pickup signal obtained from the image pickup unit, the image pickup unit including:

an image pickup section including a plurality of pixels, each of the pixels including a photoelectric conversion device; and a drive section performing line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset, wherein the drive section intermittently performs the line-sequential reset drive multiple times during one frame period, to allow a non-overlap period to be provided at least in part of the reset operation periods in an overlap period, the overlap period being a period during which a drive period of one of the multiple line-sequential reset drives and a drive period of one of the remaining multiple line-sequential reset drives are overlapped, and the non-overlap period being a period during which each of the reset operations by the one of the multiple line-sequential drives is not overlapped with any of the reset operations by the one of the remaining multiple line-sequential reset drives.

The present application contains subject matter related to that disclosed in Japanese Priority Patent Application JP 2011-178682 filed in the Japan Patent Office on Aug. 18, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup unit comprising:
   an image pickup section including a plurality of pixels, each of the pixels including a photoelectric conversion device; and
   a drive section performing a line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset, wherein
   the drive section intermittently performs the line-sequential reset drive multiple times during one frame period, to allow a non-overlap period to be provided at least in part of the reset operation periods in an overlap period, the overlap period being a period during which a drive period of one of the multiple line-sequential reset drives and a drive period of one of the remaining multiple line-sequential reset drives are overlapped, and the non-overlap period being a period during which each of the reset operations by the one of the multiple line-sequential drives is not overlapped with any of the reset operations by the one of the remaining multiple line-sequential reset drives.

2. The image pickup unit according to claim 1, wherein the non-overlap period is provided only in a part of the periods of the reset operation in the overlap period.

3. The image pickup unit according to claim 1, wherein all of the periods of the reset operations in the overlap period correspond to the non-overlap period.

4. The image pickup unit according to claim 1, wherein the drive section includes a scan section performing line-sequential scanning with respect to the plurality of pixels at the time of the line-sequential readout drive and the line-sequential reset drive.

5. The image pickup unit according to claim 4, wherein the scan section includes a plurality of columns of shift resistor circuit sections provided to correspond to the number of executions of the line-sequential reset drive, and a logic circuit generating logical sum signals of output signals from each of the columns of the shift resistor circuit sections while controlling a valid period of each of the output signals.

6. The image pickup unit according to claim 1, wherein the line-sequential readout drive and a first-time line sequential reset drive are performed by a single line-sequential drive at a time.

7. The image pickup unit according to claim 6, wherein
   the drive section includes a charge amplifier, a first input terminal of the charge amplifier being connected to a signal line used at the time of the readout operation, a second input terminal of the charge amplifier being supplied with a predetermined reset voltage, and
   the reset operation at the time of the first-time line-sequential reset drive is performed with use of an imaginary short phenomenon in the charge amplifier.

8. The image pickup unit according to claim 7, wherein the reset operation at the time of the second-time and subsequent line-sequential reset drive is performed with use of a feedback characteristic or an imaginary short phenomenon in the charge amplifier.

9. The image pickup unit according to claim 1, wherein the line-sequential readout drive and each time of the line-sequential reset drive are independently and separately performed.

10. The image pickup unit according to claim 9, wherein each of the pixels includes a reset transistor, and
    the reset operation at the time of each time of the line-sequential reset drive is performed by turning on the reset transistor.

11. The image pickup unit according to claim 1, wherein the line-sequential reset drive is intermittently performed multiple times over a period exceeding one horizontal period.

12. The image pickup unit according to claim 1, wherein the photoelectric conversion device is formed of a PIN photodiode.

13. The image pickup unit according to claim 1, wherein the image pickup section generates an electrical signal based on incident radiation, and
    the image pickup unit is configured as a radiation image pickup unit.

14. The image pickup unit according to claim 13, wherein the image pickup section includes a photoelectric conversion layer configuring the photoelectric conversion device, and a wavelength conversion layer converting a wavelength of the radiation into a wavelength in a sensitive range of the photoelectric conversion layer.

15. The image pickup unit according to claim 13, wherein the image pickup section includes a photoelectric conversion layer, the photoelectric conversion layer configuring the photoelectric conversion device and directly generating the electrical signal based on the radiation.

16. The image pickup unit according to claim 13, wherein the radiation is an X-ray.

17. An image-pickup and display system including an image pickup unit and a display displaying an image based on an image pickup signal obtained from the image pickup unit, the image pickup unit comprising:
- an image pickup section including a plurality of pixels, each of the pixels including a photoelectric conversion device; and
- a drive section performing line-sequential readout drive for line-sequentially performing readout operation and a line-sequential reset drive for line-sequentially performing reset operation, the readout operation allowing a signal charge obtained by the photoelectric conversion device to be read out from each of the pixels, the reset operation allowing the signal charge in the pixel to be reset, wherein
- the drive section intermittently performs the line-sequential reset drive multiple times during one frame period, to allow a non-overlap period to be provided at least in part of the reset operation periods in an overlap period, the overlap period being a period during which a drive period of one of the multiple line-sequential reset drives and a drive period of one of the remaining multiple line-sequential reset drives are overlapped, and the non-overlap period being a period during which each of the reset operations by the one of the multiple line-sequential drives is not overlapped with any of the reset operations by the one of the remaining multiple line-sequential reset drives.

* * * * *